(12) United States Patent
Sakurai

(10) Patent No.: US 12,106,128 B2
(45) Date of Patent: Oct. 1, 2024

(54) INFORMATION PROCESSING APPARATUS, INFORMATION PROCESSING SYSTEM, AND NON-TRANSITORY RECORDING MEDIUM

(71) Applicant: Rikuto Sakurai, Kanagawa (JP)

(72) Inventor: Rikuto Sakurai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/889,431

(22) Filed: Aug. 17, 2022

(65) Prior Publication Data

US 2023/0098928 A1 Mar. 30, 2023

(30) Foreign Application Priority Data

Sep. 28, 2021 (JP) ................................. 2021-158286

(51) Int. Cl.
G06F 9/45 (2006.01)
G06F 9/451 (2018.01)

(52) U.S. Cl.
CPC .................................. *G06F 9/452* (2018.02)

(58) Field of Classification Search
None
See application file for complete search history.

(56) References Cited

U.S. PATENT DOCUMENTS

2021/0271716 A1* 9/2021 Watanabe ............. G06F 3/0483
2022/0100750 A1* 3/2022 Khan .................... G16H 10/60

FOREIGN PATENT DOCUMENTS

JP 2008-259211 10/2008

OTHER PUBLICATIONS

U.S. Appl. No. 17/707,982, filed Mar. 30, 2022, Yohsuke Utoh.

* cited by examiner

*Primary Examiner* — Craig C Dorais
(74) *Attorney, Agent, or Firm* — XSENSUS LLP

(57) ABSTRACT

An information processing apparatus includes circuitry to transmit electronic data received from a user terminal to another information processing apparatus via a network, the electronic data to be processed by the information processing apparatus, acquire identification information of the electronic data stored by the another information processing apparatus from the another information processing apparatus, and transmit, to the user terminal, screen information representing a screen for requesting the electronic data including the identification information received from the another information processing apparatus.

13 Claims, 29 Drawing Sheets

FIG. 11

| NO. | 1 | 2 |
|---|---|---|
| STARTING TRIGGER | SAVING DOCUMENT AND SETTING METADATA (INCLUDING DESTINATION) | MONTHLY "X"-TH DAY |
| FLOW 1 | EXAMINATION BY PERSON "A" | EXAMINATION BY PERSON "A" |
| FLOW 2 | EXAMINATION BY PERSON "B" | — |
| FLOW 3 | APPROVAL BY PERSON "C" | APPROVAL BY PERSON "D" |
| FLOW 4 | UPLOADING DOCUMENT TO ELECTRONIC CONTRACT SYSTEM | UPLOADING DOCUMENT TO ELECTRONIC CONTRACT SYSTEM |

| NO. | 1 |
|---|---|
| STARTING TRIGGER | SAVING DOCUMENT AND SETTING METADATA (INCLUDING DESTINATION) |
| FLOW 1 | EXAMINATION PROCESS |
| FLOW 2 | EXAMINATION PROCESS |
| FLOW 3 | APPROVAL PROCESS |
| FLOW 4 | UPLOADING DOCUMENT TO ELECTRONIC CONTRACT SYSTEM |

FIG. 12B

| NO. | 1 |
|---|---|
| STARTING TRIGGER | SAVING DOCUMENT AND SETTING METADATA (INCLUDING DESTINATION) |
| FLOW 1 | PERSON "A" |
| FLOW 2 | PERSON "B" |
| FLOW 3 | PERSON "C" |
| FLOW 4 | |

FIG. 13

| NO. | 1 |
|---|---|
| STARTING TRIGGER | SAVING DOCUMENT AND SETTING METADATA (INCLUDING DESTINATION) |
| FLOW 1 | EXAMINATION PROCESS BY EXAMINER |
| FLOW 2 | APPROVAL PROCESS BY APPROVER |
| ENDING | UPLOADING DOCUMENT TO ELECTRONIC CONTRACT SYSTEM AND SETTING DESTINATION INFORMATION |

1041

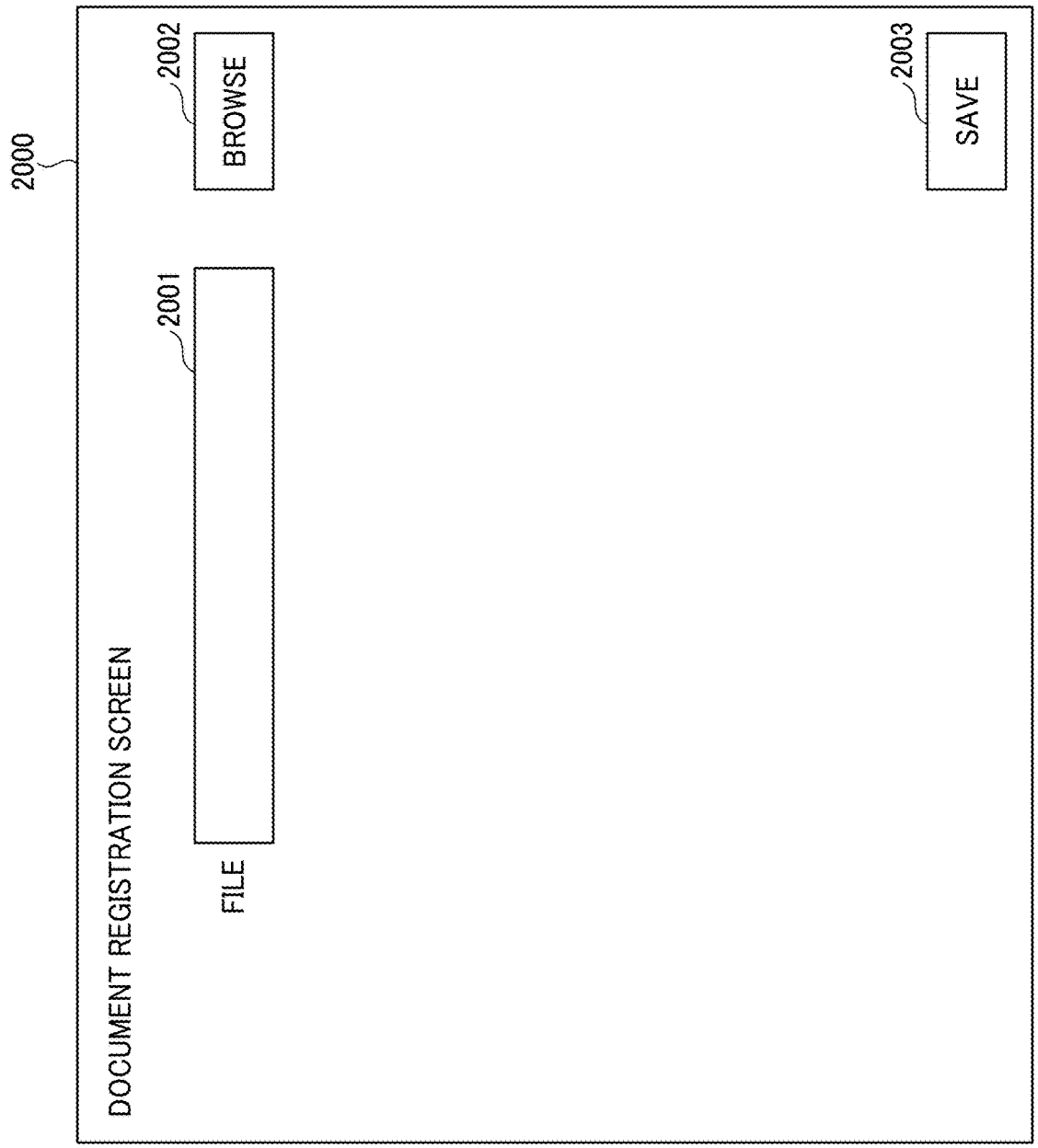

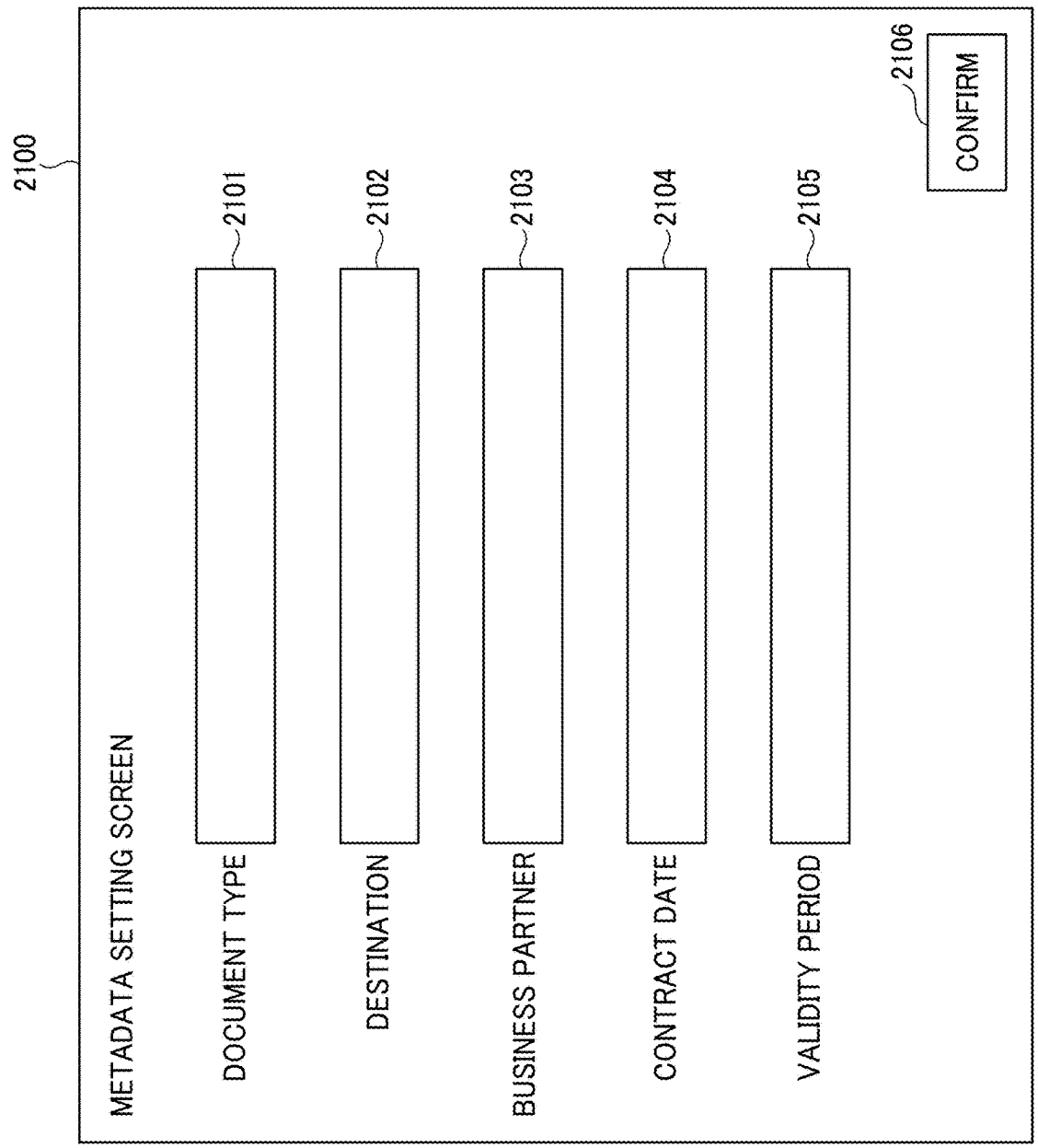

FIG. 16

| DOCUMENT ID | DOCUMENT TYPE | DESTINATION | BUSINESS PARTNER | CONTRACT DATE | VALIDITY PERIOD | ... |
|---|---|---|---|---|---|---|
| 111 | CONTRACT | 111@example.com | XXX COMPANY | 2021/07/13 | 2022/07/13 | ... |
| 222 | CONTRACT | 222@example.com | YYY COMPANY | 2021/05/30 | 2022/05/30 | ... |
| 333 | CONTRACT | 333@example.com | ZZZ COMPANY | 2021/06/24 | - | ... |

| DOCUMENT ID | DOCUMENT TYPE | DESTINATION | BUSINESS PARTNER | CONTRACT DATE | VALIDITY PERIOD | ... |
|---|---|---|---|---|---|---|
| 111 | - | - | - | - | - | ... |

| DOCUMENT ID | DOCUMENT TYPE | DESTINATION | BUSINESS PARTNER | CONTRACT DATE | VALIDITY PERIOD | ... |
|---|---|---|---|---|---|---|
| 111 | CONTRACT | 111@example.com | XXX COMPANY | - | 2022/07/13 | ... |

1030

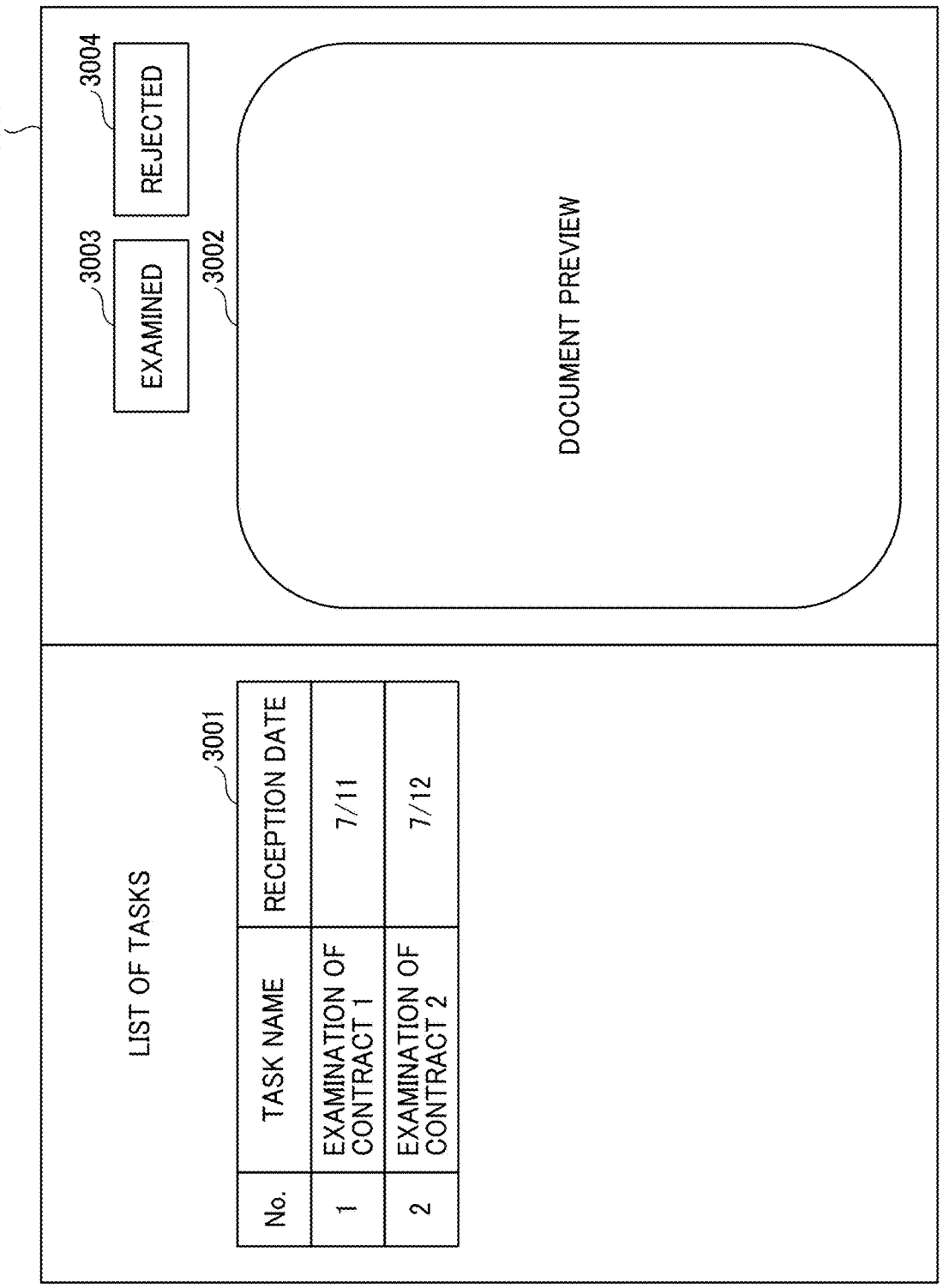

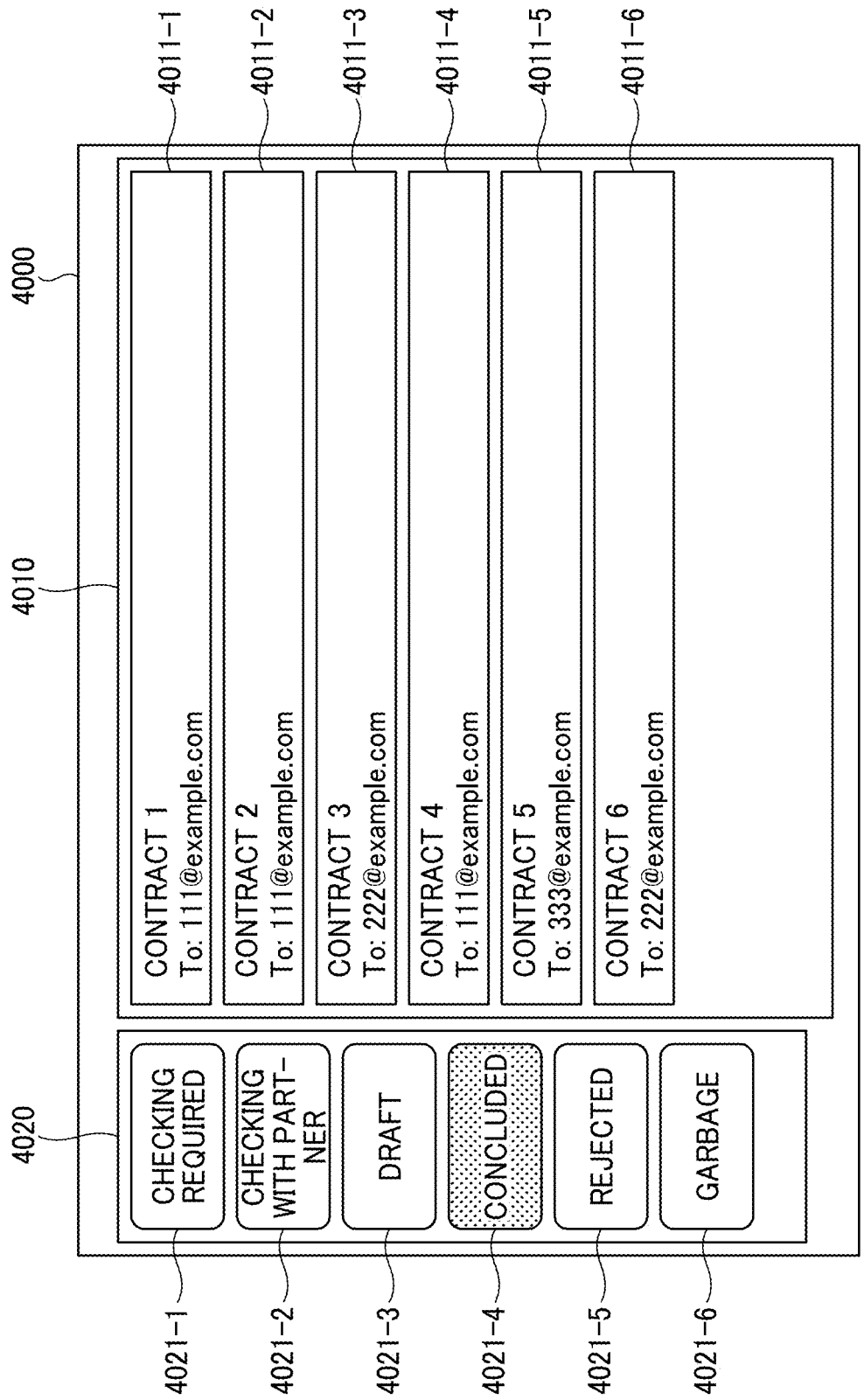

4103
AS DESCRIBED ABOVE, IN ORDER TO PROVE THE CONCLUSION OF THIS CONTRACT, TWO COPIES OF THIS DOCUMENT SHALL BE CREATED, SIGNED AND STAMPED, AND EACH PARTY SHALL HAVE ONE COPY.

R-YY YEAR MM MONTH DD DATE

ADDRESS
COMPANY NAME
TITLE
NAME

STAMP

4102
INPUT ITEMS
◯ STAMP
FREE TEXT
☐ CHECK BOX
⦿ RADIO BUTTON
PLEASE SELECT

4101
SENDER
XXXX
xxxx@example.com
→
DESTINATION
YYYY
yyyy@example.com

4104 TRANSMIT

FIG. 24

| NO. | 1 | |
|---|---|---|
| STARTING TRIGGER | SAVING DOCUMENT AND SETTING METADATA (INCLUDING DESTINATION) | |
| FLOW 1 | EXAMINATION PROCESS BY EXAMINER | |
| FLOW 2 | APPROVAL PROCESS BY APPROVER | |
| FLOW 3 | UPLOADING DOCUMENT TO ELECTRONIC CONTRACT SYSTEM AND SETTING DESTINATION INFORMATION | |
| FLOW 4 | ACQUIRING PROCESSING RESULT FROM ELECTRONIC CONTRACT SYSTEM | |
| ENDING | DOCUMENT PROCESS BY OPERATOR | |

| DOCUMENT ID | DOCUMENT TYPE | DESTINATION | BUSINESS PARTNER | CONTRACT DATE | VALIDITY PERIOD | DOCUMENT URL BEFORE CONTRACT CONCLUSION |
|---|---|---|---|---|---|---|
| 111 | - | - | - | - | - | - |

FIG. 25B

| DOCUMENT ID | DOCUMENT TYPE | DESTINATION | BUSINESS PARTNER | CONTRACT DATE | VALIDITY PERIOD | DOCUMENT URL BEFORE CONTRACT CONCLUSION |
|---|---|---|---|---|---|---|
| 111 | CONTRACT | 111@example.com | XXX COMPANY | - | 2022/07/13 | - |

FIG. 25C

| DOCUMENT ID | DOCUMENT TYPE | DESTINATION | BUSINESS PARTNER | CONTRACT DATE | VALIDITY PERIOD | DOCUMENT URL BEFORE CONTRACT CONCLUSION |
|---|---|---|---|---|---|---|
| 111 | CONTRACT | 111@example.com | XXX COMPANY | - | 2022/07/13 | https://xxx.com/aaaa |

FIG. 26

METADATA SETTING SCREEN — 2110

| Field | Value | Ref |
|---|---|---|
| DOCUMENT TYPE | CONTRACT | 2101 |
| DESTINATION | 111@example.com | 2102 |
| BUSINESS PARTNER | XXX COMPANY | 2103 |
| CONTRACT DATE | | 2104 |
| VALIDITY PERIOD | 2022/07/13 | 2105 |
| DOCUMENT BEFORE CONTRACT CONCLUSION | https://xxx.com/aaaa | 2111 |

CONFIRM — 2106

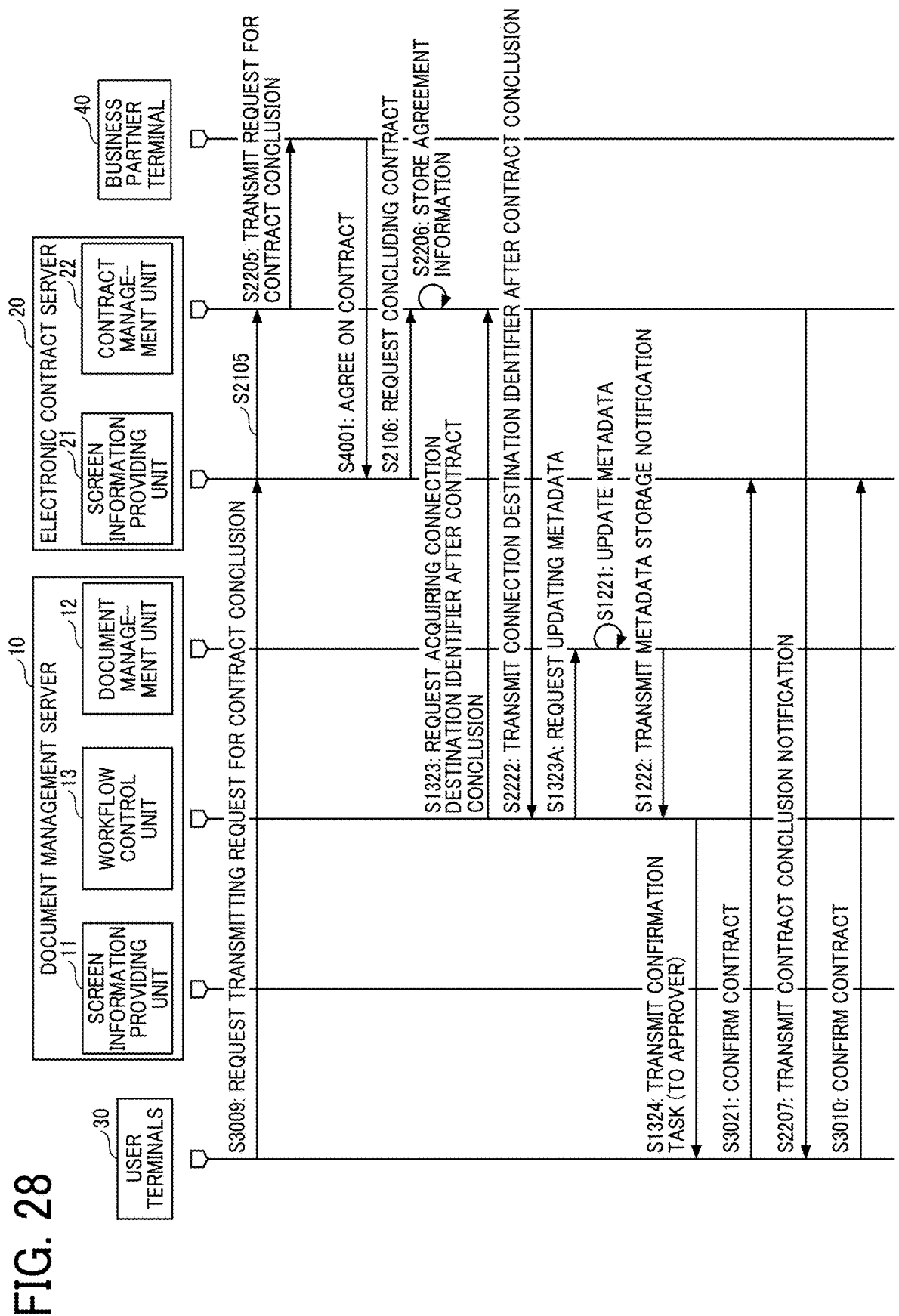

FIG. 29

| NO. | 1 | |
|---|---|---|
| STARTING TRIGGER | SAVING DOCUMENT AND SETTING METADATA (INCLUDING DESTINATION) | |
| FLOW 1 | EXAMINATION PROCESS BY EXAMINER | |
| FLOW 2 | APPROVAL PROCESS BY APPROVER | |
| FLOW 3 | UPLOADING DOCUMENT TO ELECTRONIC CONTRACT SYSTEM AND SETTING DESTINATION INFORMATION | |
| FLOW 4 | ACQUIRING PROCESSING RESULT FROM ELECTRONIC CONTRACT SYSTEM | |
| FLOW 5 | DOCUMENT PROCESS BY OPERATOR | |
| FLOW 6 | ACQUIRING DOCUMENT INFORMATION FROM ELECTRONIC CONTRACT SYSTEM (EXECUTION PERIODICALLY) | |
| FLOW 7 | TRANSMITTING CONTRACT CONCLUSION NOTIFICATION TO APPROVER | |
| ENDING | CONFIRMING DOCUMENT AFTER CONTRACT CONCLUSION BY APPROVER | |

| DOCUMENT ID | DOCUMENT TYPE | DESTINATION | BUSINESS PARTNER | CONTRACT DATE | VALIDITY PERIOD | DOCUMENT URL BEFORE CONTRACT CONCLUSION | DOCUMENT URL AFTER CONTRACT CONCLUSION |
|---|---|---|---|---|---|---|---|
| 111 | CONTRACT | 111@example.com | XXX COMPANY | - | 2022/07/13 | https://xxx.com/aaaa | - |

FIG. 30B

| DOCUMENT ID | DOCUMENT TYPE | DESTINATION | BUSINESS PARTNER | CONTRACT DATE | VALIDITY PERIOD | DOCUMENT URL BEFORE CONTRACT CONCLUSION | DOCUMENT URL AFTER CONTRACT CONCLUSION |
|---|---|---|---|---|---|---|---|
| 111 | CONTRACT | 111@example.com | XXX COMPANY | 2022/07/13 | 2022/07/13 | https://xxx.com/aaaa | https://xxx.com/bbbb |

FIG. 31

METADATA SETTING SCREEN — 2120

| Field | Value | Ref |
|---|---|---|
| DOCUMENT TYPE | CONTRACT | 2101 |
| DESTINATION | 111@example.com | 2102 |
| BUSINESS PARTNER | XXX COMPANY | 2103 |
| CONTRACT DATE | 2021/07/13 | 2104 |
| VALIDITY PERIOD | 2022/07/13 | 2105 |
| DOCUMENT BEFORE CONTRACT CONCLUSION | https://xxx.com/aaaa | 2111 |
| DOCUMENT AFTER CONTRACT CONCLUSION | https://xxx.com/bbbb | 2121 |

CONFIRM — 2106

INFORMATION PROCESSING APPARATUS, INFORMATION PROCESSING SYSTEM, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-158286, filed on Sep. 28, 2021, in the Japan Patent Office, the entire disclosure of which is hereby incorporated by reference herein.

BACKGROUND

Technical Field

The present disclosure relates to an information processing apparatus, an information processing system, and a non-transitory recording medium.

Related Art

A document management system for electronically managing electronic data such as documents generated in business is used. Also, an electronic contract system for electronically concluding a contract using electronic data is used. A first information processing apparatus included in such a document management system manages electronic data used for concluding a contract by a second information processing apparatus included in such an electronic contract system in cooperation with each other.

For example, a document management system includes an information processing apparatus which switches document processing operations based on metadata added to an electronic document or electronic data.

SUMMARY

In one aspect, an information processing apparatus includes circuitry to transmit electronic data received from a user terminal to another information processing apparatus via a network, the electronic data to be processed by the information processing apparatus, acquire identification information of the electronic data stored by the another information processing apparatus from the another information processing apparatus, and transmit, to the user terminal, screen information representing a screen for requesting the electronic data including the identification information received from the another information processing apparatus.

In another aspect, an information processing system includes a first information processing apparatus, a second information processing apparatus, and a user terminal. The first information processing apparatus, the second information processing apparatus, and the user terminal are communicable with one another via a network. The first information processing apparatus includes first circuitry to transmit electronic data to the second information processing apparatus received from the user terminal, acquire identification information of the electronic data stored by the second information processing apparatus from the second information processing apparatus, and transmits, to the user terminal, screen information representing a screen for requesting the electronic data including the identification information received from the second information processing apparatus. The second information processing apparatus includes second circuitry to process the electronic data transmitted from the user terminal via the first information processing apparatus and generate the identification information of the electronic data. The user terminal includes third circuitry to display the screen based on the screen information received from the first information processing apparatus.

In another aspect, a non-transitory recording medium storing a plurality of program codes which, when executed by one or more processors, causes the processors to perform a method. The method includes transmitting electronic data received from a user terminal to another information processing apparatus via a network, the electronic data to be processed by the information processing apparatus, acquiring identification information of the electronic data stored by the another information processing apparatus from the another information processing apparatus, and transmitting, to the user terminal, screen information representing a screen for requesting the electronic data including the identification information received from the another information processing apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a table illustrating an example of workflow information according to one embodiment of the present disclosure;

FIGS. 12A and 12B are tables each illustrating another example of the workflow information according to one embodiment of the present disclosure;

FIG. 13 is a table illustrating a specific example of the workflow information according to one embodiment of the present disclosure;

FIG. 14 is a view illustrating an example of a document registration screen according to one embodiment of the present disclosure;

FIG. 15 is a view illustrating an example of a metadata setting screen according to the comparative example;

FIG. 16 is a table illustrating an example of a metadata table according to the comparative example;

FIG. 17A is a table illustrating a specific example of metadata generated when a document is stored according to the comparative example;

FIG. 17B is a table illustrating a specific example of the metadata updated when the metadata is stored according to the comparative example;

FIG. 18 is a view illustrating an example of a task processing screen according to one embodiment of the present disclosure;

FIG. 19 is a view illustrating an example of a contract selection screen according to one embodiment of the present disclosure;

FIG. 20 is a view illustrating an example of a contract setting screen according to one embodiment of the present disclosure;

FIG. 24 is a table illustrating an example of workflow information according to the first embodiment of the present disclosure;

FIG. 25A is a table illustrating a specific example of metadata generated when a document is stored according to the first embodiment of the present disclosure;

FIG. 25B is a table illustrating a specific example of the metadata updated when the metadata is stored according to the first embodiment of the present disclosure;

FIG. 25C is a table illustrating a specific example of the metadata updated when a connection destination identifier is acquired according to the first embodiment of the present disclosure;

FIG. 26 is a view illustrating an example of a metadata setting screen according to the first embodiment of the present disclosure;

FIG. 28 is a sequence chart illustrating a processing procedure performed by the information processing system according to the second embodiment of the present disclosure;

FIG. 29 is a table illustrating an example of workflow information according to the second embodiment of the present disclosure;

FIG. 30A is a table illustrating a specific example of metadata updated when a connection destination identifier before contract conclusion is acquired according to the second embodiment of the present disclosure;

FIG. 30B is a table illustrating a specific example of the metadata updated when a connection destination identifier after contract conclusion is acquired according to the second embodiment of the present disclosure; and FIG. 31 is a view illustrating an example of a metadata setting screen according to the second embodiment of the present disclosure.

Figure 1:
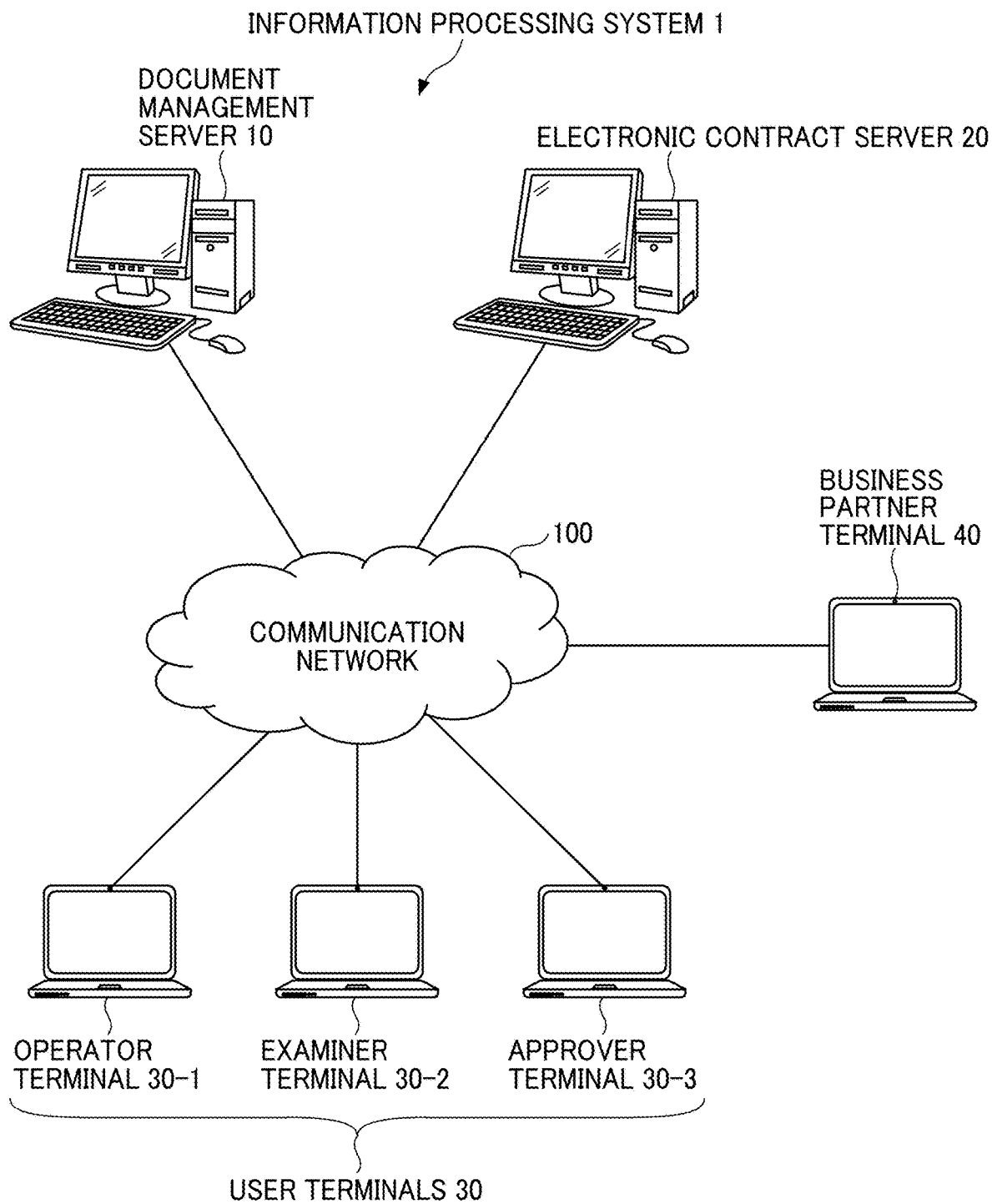
FIG. 1 is a schematic diagram illustrating an overall configuration of an information processing system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described in detail with reference to the drawings. In the description of the drawings, the same elements are denoted by the same reference numerals, and redundant descriptions thereof are omitted.

Generally, a document management system is an information processing system for electronically storing, managing, and utilizing documents generated in business in a company or the like. Also, an electronic contract system is an information processing system for electronically concluding a contract in a company or the like.

The document management system may be insufficient to cover an entire business flow. For example, a document processed by the document management system is printed on paper for processing a contract according to a conventional contract processing method. In such a case, the contract processing such as signing or stamping is executed on the document printed on the paper and the document printed on the paper is stored again in the document management system by being scanned.

Since the contract processing based on a document printed on paper is costly because of printing or storing the document and inefficient to search for the document, both the document management system and the electronic contract system are used in combination. However, simply using both the document management system and the electronic contract system in combination causes an issue that user operations are complicated since each system operates independently.

For example, when a user desires to refer to a document stored in the electronic contract system, the user needs to log in to the electronic contract system and search for the desired document among many documents stored in the electronic contract system.

According to one embodiment of the present disclosure, a document management server stores a document managed by the document management server and identification information used in an electronic contract system for identifying the document in association with each other, and outputs screen information representing a screen indicating the identification information and information on the document in association with each other. Thus, the user can operate the document management server to directly display the document stored in the electronic contract system on the screen output by the document management serve. In other words, the document management server according to one embodiment of the present disclosure saves the user logging into the electronic contract system and searching for the desired document since the document management server displays the document stored in the electronic contract system.

First Embodiment

According to a first embodiment of the present disclosure, a document management system stores, in metadata stored in association with a document, identification information used in an electronic contract system for identifying the document. The document management system outputs screen information representing a screen indicating information on the document and the identification information in association with each other to a user terminal.

The document according to the present embodiment is electronic data representing the contents of a document or the like. The electronic data represents the contents of not only a document but also any information such as a text, an image, or a moving image.

The identification information according to the present embodiment is information that allows the document management system to directly access the document stored in the electronic contract system. For example, the identification information is a connection destination identifier for identifying a connection destination of a document in the electronic contract system. The connection destination identifier is, for example, a uniform resource locator (URL) that specifies a location of the document in an electronic space or an access key to be input for displaying a specific document.

Overall Configuration of Information Processing System

A description is given of an overall configuration of an information processing system 1 according to the present embodiment with reference to FIG. 1. FIG. 1 is a schematic diagram illustrating an example of the overall configuration of the information processing system 1 according to the present embodiment.

As illustrated in FIG. 1, the information processing system 1 includes a document management server 10, an electronic contract server 20, an operator terminal 30-1, an examiner terminal 30-2, an approver terminal 30-3, and a business partner terminal 40. The operator terminal 30-1, the examiner terminal 30-2, and the approver terminal 30-3 are classified according to the type of user, but have the same functions. Hereinafter, the operator terminal 30-1, the examiner terminal 30-2, and the approver terminal 30-3 are collectively referred to as user terminals 30, and one thereof is referred to as a user terminal 30.

The document management server 10, the electronic contract server 20, the user terminal 30, and the business partner terminal 40 are connected to a communication network 100. Each device is communicably connected to each other via the communication network 100. The communication network 100 is implemented by a wired communication network such as the Internet, a local area network (LAN), a wide area network (WAN), or the like. The communication network 100 may include not only the wired communication network but also a wireless communication network such as a wireless LAN or a short-range wireless communication, or a mobile communication such as Worldwide Interoperability for Microwave Access (WiMAX), Long Term Evolution (LTE), or the fifth generation (SG).

The document management server 10 electronically manages a document generated in business. The document management server 10 enables efficient retrieval of the document by storing metadata and the document in association with each other. In addition, the document management server 10 has a function of executing a workflow for doing business, and efficiently enables, for example, a document circulation flow.

The document management server 10 may be implemented by one information processing apparatus or may be a system implemented by a plurality of information processing apparatuses.

The electronic contract server 20 executes processing for electronically concluding a contract. The electronic contract server 20 transmits the contract to a counterpart of the contract (business partner). In a case where the business partner agrees on the contract, the electronic contract server 20 executes processing of adding an electronic signature and a 5 stamp to the contract.

The electronic contract server 20 may be implemented by one information processing apparatus or may be a system implemented by a plurality of information processing apparatuses.

The user terminals 30 are electronic devices used by users. The users operate both the document management server 10 and the electronic contract server 20 by using the user terminals 30.

According to the present embodiment, the users include an operator who prepares a contract, an examiner who examines the contents of the contract, and an approver who approves the contents of the contract. The operator terminal 30-1 is one of the user terminals 30 used by the operator. The examiner terminal 30-2 is one of the user terminals 30 used by the examiner. The approver terminal 30-3 is one of the user terminals 30 used by the approver.

The business partner terminal 40 is an electronic device used by a user at the business partner. The user at the business partner operates the electronic contract server 20 by using the business partner terminal 40.

Each example of the document management server 10, the electronic contract server 20, the user terminals 30, and the business partner terminal 40 is an information processing apparatus. Another example of each of the document management server 10, the electronic contract server 20, the user terminals 30, and the business partner terminal 40 is an image forming apparatus such as a printer, a facsimile machine, a digital multifunction peripheral/product/printer (MFP), or a scanner. Note that each of the document management server 10, the electronic contract server 20, the user terminals 30, and the business partner terminal 40 may be any information processing apparatus or image forming apparatus having a communication function.

Each of the document management server 10, the electronic contract server 20, the user terminals 30, and the business partner terminal 40 may be, for example, a projector, an interactive white board (IWB; an electronic white board having a blackboard function capable of mutual communication), an output device such as a digital signage, a head-up display (IIUD) device, an industrial machine, an imaging device, a sound collecting device, a medical device, a network home appliance, an automobile (connected car), a laptop personal computer (PC), a mobile phone, a smartphone, a tablet terminal, a game console, a personal digital assistant (PDA), a digital camera, a wearable PC, or a desktop PC.

Figure 2:
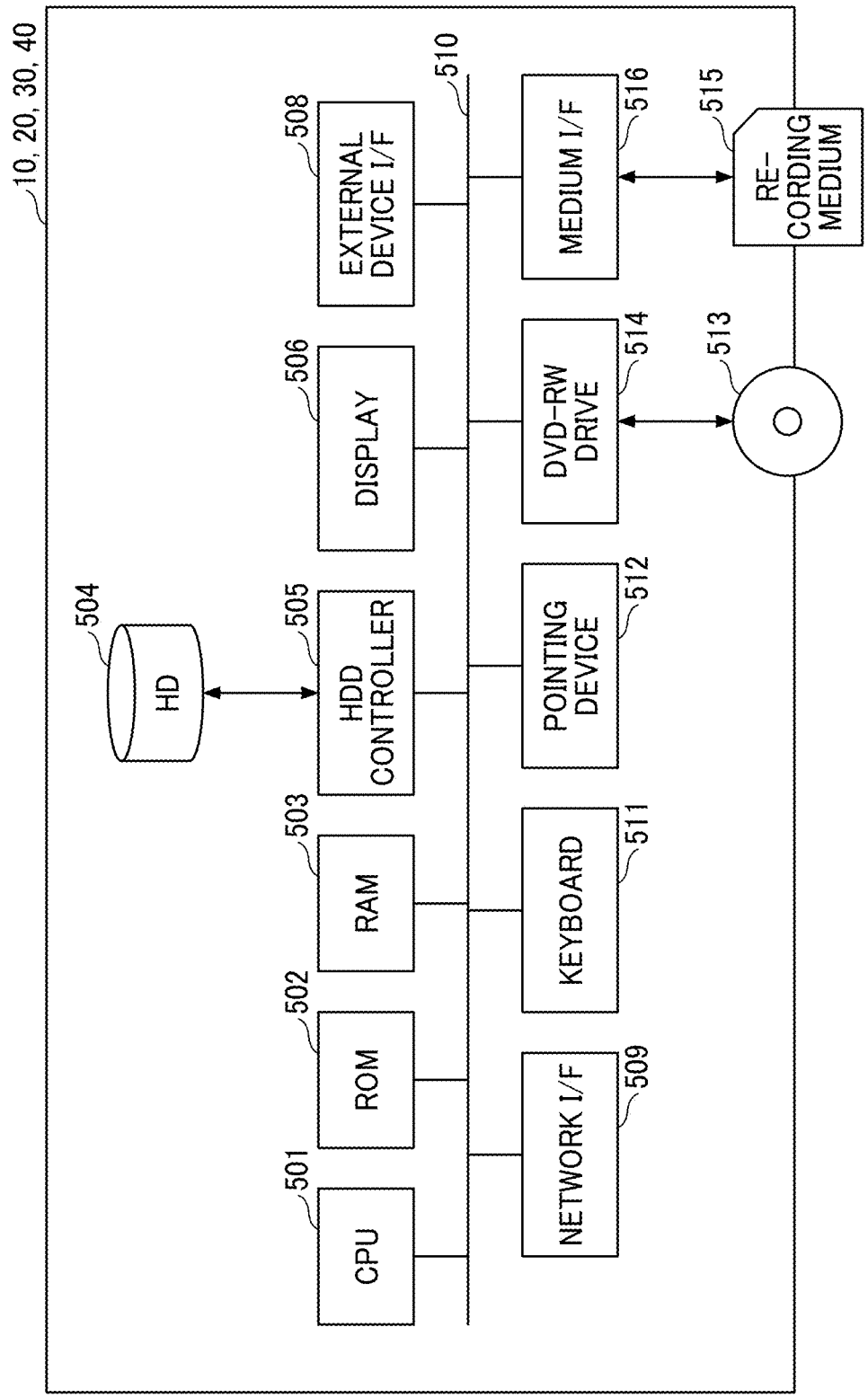
FIG. 2 is a block diagram illustrating a hardware configuration of an information processing apparatus according to one embodiment of the present disclosure.
Figure 3:
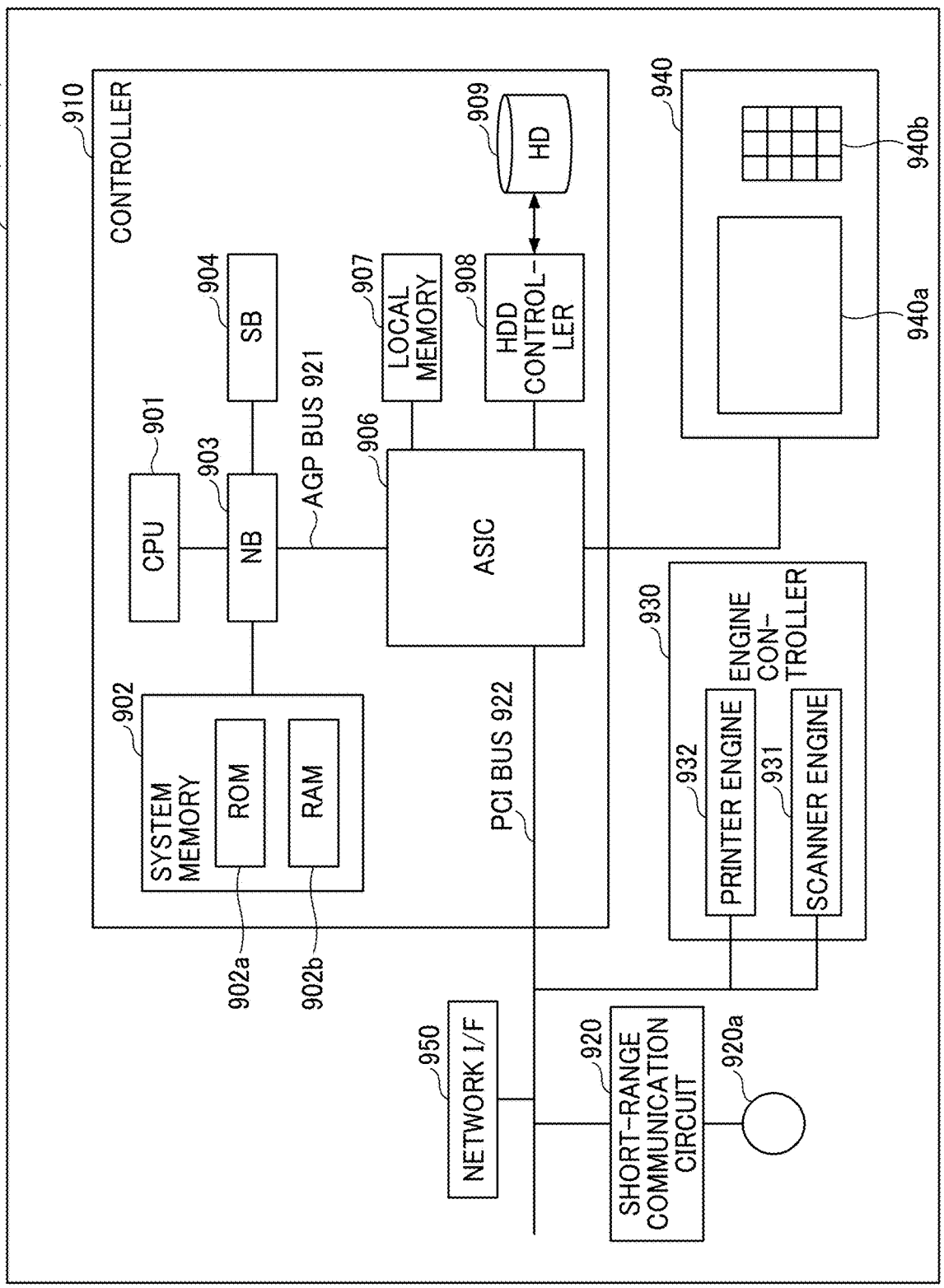
FIG. 3 is a block diagram illustrating a hardware configuration of an image forming apparatus according to one embodiment of the present disclosure.

Hardware Configuration of Each Apparatus Included in Information Processing System A description is given of a hardware configuration of each apparatus included in the information processing system 1 according to the present embodiment with reference to FIGS. 2 and 3.

Hardware Configuration of Information Processing Apparatus

FIG. 2 is a block diagram illustrating an example of a hardware configuration of an information processing apparatus in a case where each of the document management server 10, the electronic contract server 20, the user terminals 30, and the business partner terminal 40 is implemented as an information processing apparatus. As illustrated in FIG. 2, the information processing apparatus includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a data bus 510, a keyboard 511, a pointing device 512, a digital versatile disc rewritable (DVD-RW) drive 514, and a medium I/F 516.

The CPU 501 controls entire operation of the information processing apparatus. The ROM 502 stores a program such as an initial program loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, characters, and images. The external device I/F 508 is an interface for connection with various external devices. Examples of the external devices include, but not limited to, a universal serial bus (USB) memory and a printer. The network I/F 509 is an interface for data communication through the communication network 100. The data bus 510 is an address bus or a data bus, which electrically connects each component illustrated in FIG. 2 such as the CPU 501.

The keyboard 511 is an example of an input device including a plurality of keys for inputting characters, numerical values, various instructions, and the like. The pointing device 512 is an example of an input device that allows a user to select or execute various instructions, select an object for processing, and move a cursor being displayed. The DVD-RW drive 514 controls reading and writing of various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a recording medium 515 such as a flash memory.

Hardware Configuration of Image Forming Apparatus

FIG. 3 is a block diagram illustrating an example of a hardware configuration of an image forming apparatus in a case where each of the document management server 10, the electronic contract server 20, the user terminals 30, and the business partner terminal 40 is implemented as an image forming apparatus. As illustrated in FIG. 3, the image forming apparatus includes a controller 910, a short-range communication circuit 920, an engine controller 930, a control panel 940, and a network I/F 950.

The controller 910 includes a CPU 901 as a main processor, a system memory 902, a north bridge (NB) 903, a south bridge (SB) 904, an application specific integrated circuit (ASIC) 906, a local memory 907 as a storage area, an HDD controller 908, and an HD 909 as a storage area. The NB 903 and the ASIC 906 are connected via an accelerated graphics port (AGP) bus 921.

The CPU 901 controls entire operation of the image forming apparatus. The NB 903 is a bridge for connecting the CPU 901 with the system memory 902, the SB 904, and the AGP bus 921. The NB 903 includes a memory controller for controlling reading and writing of various data from and to the system memory 902, a peripheral component interconnect (PCI) master, and an AGP target.

The system memory 902 includes a ROM 902a as a memory that stores a program and data for implementing various functions of the controller 910. The system memory 902 further includes a RAM 902b used as a memory to load the program and the data, or as a drawing memory that stores drawing data for printing. The program stored in the ROM 902a may be stored in any computer-readable recording medium, such as a compact disc read only memory (CD-ROM), a compact disc recordable (CD-R), or a digital versatile disc (DVD), in a file format installable or executable by a computer, for distribution.

The SB 904 is a bridge for connecting the NB 903 to a PCI device and a peripheral device. The ASIC 906 is an integrated circuit (IC) for image processing applications including hardware elements for image processing and has a role of a bridge connecting the AGP bus 921, a PCI bus 922, the HDD controller 908, and the local memory 907 each other. The ASIC 906 includes a PCI target, an AGP master, an arbiter (ARB) as a central processor of the ASIC 906, a memory controller to control the local memory 907, a plurality of direct memory access controllers (DMACs), and a PCI unit. The DMACs rotate image data by converting coordinates of the image data with, for example, a hardware logic. The PCI unit transfers data between the scanner engine 931 and the printer engine 932 via the PCI bus 922. The ASIC 906 may be connected to a USB interface, the Institute of Electrical and Electronics Engineers 1394 (IEEE 1394) interface, or both.

The local memory 907 is a local memory used as a copy image buffer and a code buffer. The HD 909 is a storage for storing image data, font data used during printing, and forms. The HDD controller 908 controls reading and writing of various data from and to the HD 909 under control of the CPU 901. The AGP bus 921 is a bus interface for a graphics accelerator card, which has been proposed to accelerate graphics processing. Through directly accessing the system memory 902 by high-throughput, speed of the graphics accelerator card is improved.

The short-range communication circuit 920 includes a short-range communication antenna 920a. The short-range communication circuit 920 is a communication circuit in compliance with the near field communication (NFC), BLUETOOTH, or the like.

The engine controller 930 includes the scanner engine 931 and the printer engine 932. The control panel 940 includes a panel display 940a and an operation panel 940b. The panel display 940a is, for example, a touch panel that displays current settings or a selection screen and receives a user input. The operation panel 940b includes, for example, a numeric keypad and a start key. The numeric keypad receives assigned values of image forming parameters such as an image density parameter. The start key receives an instruction to start copying, for example. The controller 910 controls entire operation of the image forming apparatus. For example, the controller 910 controls rendering, communication, and user inputs from the control panel 940. The scanner engine 931 or the printer engine 932 includes an image processing unit for error diffusion, gamma conversion, and the like.

The image forming apparatus may sequentially switch to select a document server function, a copying function, a printing function, and a facsimile communication function by an application switching key of the control panel 940. When the document server function is selected, a document server mode is set, when the copying function is selected, a copy mode is set, when the printing function is selected, a printer mode is set, and when the facsimile communication function is selected, a facsimile mode is set.

The network I/F 950 is an interface for data communication through the communication network 100. The short-range communication circuit 920 and the network I/F 950 are electrically connected to the ASIC 906 via the PCI bus 922.

Functional Configuration of Each Apparatus Included in Information Processing System A description is given of a functional configuration of the information processing system 1 according to the present embodiment with reference to FIGS. 4 to 7.

Functional Configuration of Document Management Server

Figure 4:
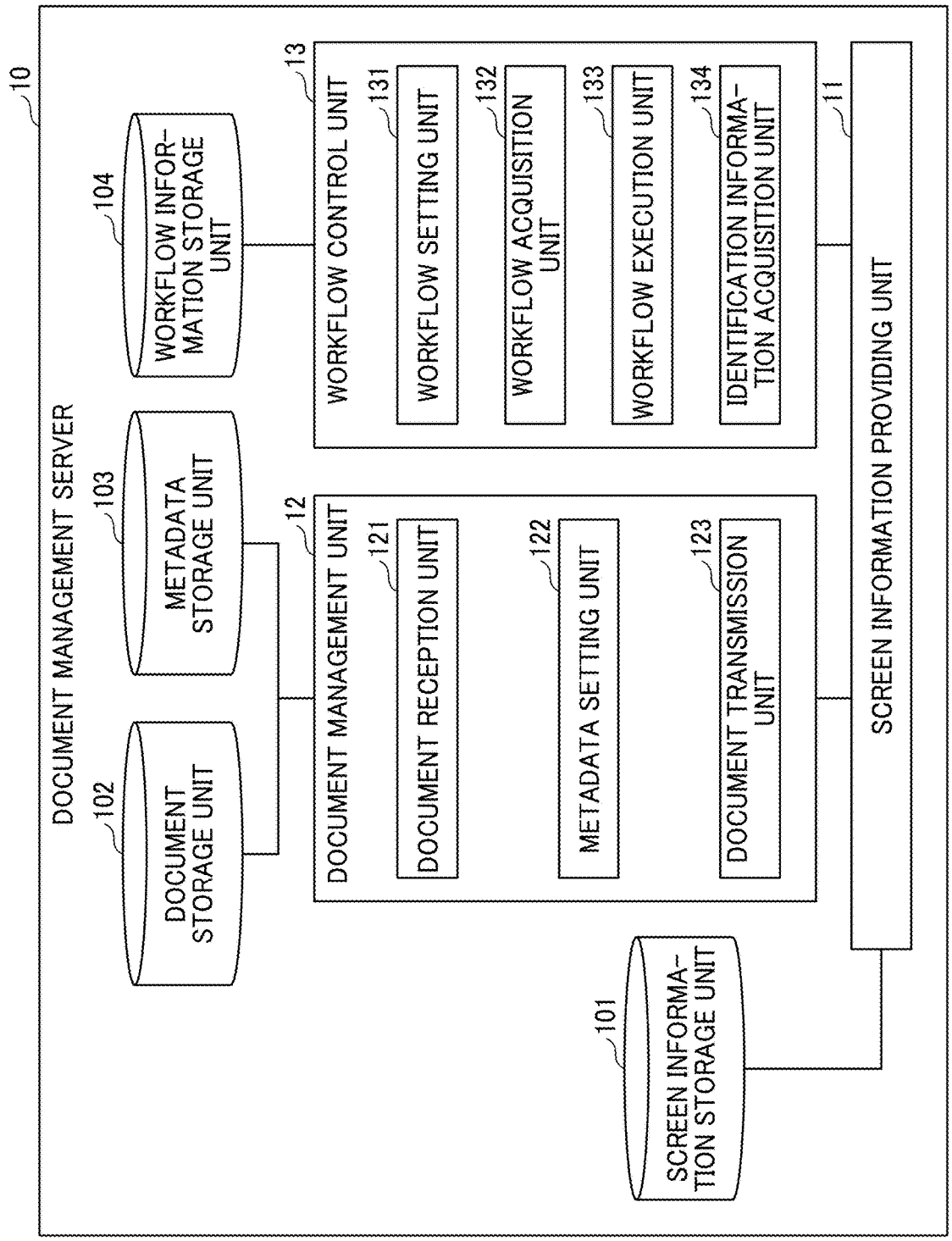
FIG. 4 is a block diagram illustrating a functional configuration of a document management server according to a first embodiment of the present disclosure.

FIG. 4 is a block diagram illustrating an example of a functional configuration of the document management server 10 according to the preset embodiment. As illustrated in FIG. 4, the document management server 10 according to the present embodiment includes a screen information providing unit 11, a document management unit 12, a workflow control unit 13, a screen information storage unit 101, a document storage unit 102, a metadata storage unit 103, and a workflow information storage unit 104. The document management unit 12 includes a document reception unit 121, a metadata setting unit 122, and a document transmission unit 123. The workflow control unit 13 includes a workflow setting unit 131, a workflow acquisition unit 132, a workflow execution unit 133, and an identification information acquisition unit 134.

The screen information providing unit 11, the document management unit 12, and the workflow control unit 13 included in the document management server 10 are implemented by, for example, the CPU 501 illustrated in FIG. 2 executing a program loaded to the RAM 503 from the HD 504.

The screen information storage unit 101, the document storage unit 102, the metadata storage unit 103, and the workflow information storage unit 104 included in the document management server 10 are implemented by using, for example, the HD 504 illustrated in FIG. 2. Reading or writing of data from and to the HD 504 is performed, for example, via the HDD controller 505.

In response to a request from a browser 31 included in the user terminal 30, the screen information providing unit 11 provides the browser 31 with screen information stored in the screen information storage unit 101. The screen information stored in the screen information storage unit 101 is information representing a screen for operating the document management server 10.

The document management unit 12 stores a document and metadata received from the user terminal 30, and executes processing on the document and the metadata according to a workflow executed by the workflow control unit 13.

The document reception unit 121 receives the document from the user terminal 30. Further, the document reception unit 121 stores the document received from the user terminal 30 in the document storage unit 102.

The metadata setting unit 122 receives the metadata from the user terminal 30. Further, the metadata setting unit 122 stores the metadata received from the user terminal 30 in the metadata storage unit 103 in association with the document stored in the document storage unit 102.

The metadata includes one or more items of attribute information representing the contents of the document. The metadata is managed separately from a body of the document. Accordingly, adding or deleting an item of the metadata, or editing such as a change of a value of the metadata docs not affect the body of the document.

In response to a request from the workflow control unit 13, the document transmission unit 123 transmits the document relating to a contract stored in the document storage unit 102 to the electronic contract server 20. In addition, the document transmission unit 123 transmits destination information of the document transmitted to the electronic contract server 20 to the electronic contract server 20.

The workflow control unit 13 sets, acquires, and executes the workflow that describes the contents of processing on the document.

The workflow setting unit 131 receives workflow information from the user terminal 30. Further, the workflow setting unit 131 stores the workflow information received from the user terminal 30 in the workflow information storage unit 104.

The workflow acquisition unit 132 acquires the workflow information stored in the workflow information storage unit 104.

The workflow execution unit 133 executes the workflow in accordance with the workflow information acquired by the workflow acquisition unit 132. The workflow execution unit 133 specifies a task to be performed next on the document and assigns the task to a user who should process the task. Further, the workflow execution unit 133 executes processing on the document in response to an operation by the user. The processing on the document includes processing to be executed in cooperation with an external system.

The identification information acquisition unit 134 acquires identification information for identifying the document relating to the contract stored in the electronic contract server 20 from the electronic contract server 20. The identification information acquisition unit 134 according to the present embodiment receives the identification information transmitted by the electronic contract server 20. The identification information acquisition unit 134 updates the metadata stored in the metadata storage unit 103 so that the identification information received from the electronic contract server 20 is included in the metadata.

The screen information storage unit 101 stores the screen information which the screen information providing unit 11 provides the browser 31 with. Each piece of the screen information stored in the screen information storage unit 101 is described in, for example, hypertext markup language (HTML), and may include an application described in JAVASCRIPT or the like.

The document storage unit 102 stores the document managed by the document management unit 12. The document stored in the document storage unit 102 is a body of an electronic file representing the contents of the document. The document is stored in the document storage unit 102 in a file format corresponding to a file system of the document storage unit 102.

The metadata storage unit 103 stores the metadata associated with the document managed by the document management unit 12. The metadata is stored in a metadata table stored in the metadata storage unit 103.

The workflow information storage unit 104 stores the workflow information on the workflow to be executed by the workflow control unit 13. The workflow information may be described in an electronic file in text format or may be stored in a table in a database.

Functional Configuration of Electronic Contract Server

Figure 5:
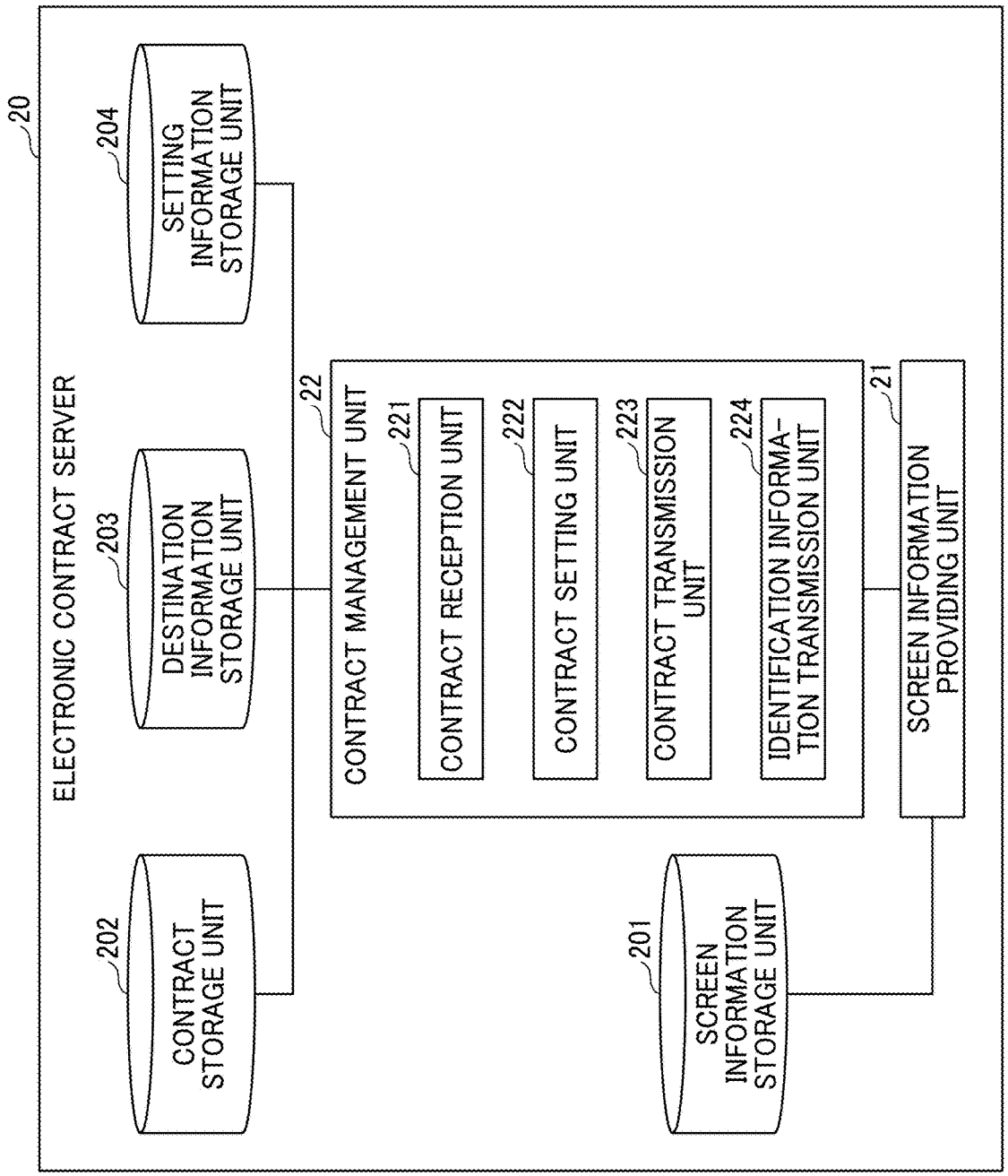
FIG. 5 is a block diagram illustrating a functional configuration of an electronic contract server according to the first embodiment of the present disclosure.

FIG. 5 is a block diagram illustrating an example of a functional configuration of the electronic contract server 20 according to the present embodiment. As illustrated in FIG. 5, the electronic contract server 20 according to the present embodiment includes a screen information providing unit 21, a contract management unit 22, a screen information storage unit 201, a contract storage unit 202, a destination information storage unit 203, and a setting information storage unit 204. The contract management unit 22 includes a contract reception unit 221, a contract setting unit 222, a contract transmission unit 223, and an identification information transmission unit 224.

The screen information providing unit 21 and the contract management unit 22 included in the electronic contract server 20 are implemented by, for example, the CPU 501 illustrated in FIG. 2 executing a program loaded to the RAM 503 from the HD 504.

The screen information storage unit 201, the contract storage unit 202, the destination information storage unit 203, and the setting information storage unit 204 included in the electronic contract server 20 are implemented by using, for example, the HD 504 illustrated in FIG. 2. Reading or writing of data from and to the HD 504 is performed, for example, via the HDD controller 505.

In response to a request from the browser 31 included in the user terminal 30 or a browser 41 included in the business partner terminal 40, the screen information providing unit 21 provides the browser 31 or the browser 41 with screen information stored in the screen information storage unit 201. The screen information stored in the screen information storage unit 201 is information representing a screen for operating the electronic contract server 20.

The contract management unit 22 stores the document relating to the contract received from the document management server 10, and executes processing on the contract in response to a request from the user terminal 30 or the business partner terminal 40.

The contract reception unit 221 receives the document relating to the contract from the document management server 10. In addition, the contract reception unit 221 stores the document relating to the contract received from the document management server 10 in the contract storage unit 202. Further, the contract reception unit 221 stores the destination information received from the document management server 10 in the destination information storage unit 203.

The contract setting unit 222 execute processing on the document relating to the contract stored in the contract storage unit 202. The processing executed by the contract setting unit 222 includes processing of performing various settings for the contract.

The contract transmission unit 223 transmits the document relating to the contract stored in the contract storage unit 202 to the business partner terminal 40.

The identification information transmission unit 224 transmits identification information for identifying the document relating to the contract stored in the contract storage unit 202 to the document management server 10.

The screen information storage unit 201 stores screen information which the screen information providing unit 21 provides the browser 31 or the browser 41 with.

The contract storage unit 202 stores the document relating to the contract managed by the contract management unit 22. The document stored in the contract storage unit 202 is a body of an electronic File representing the contents of the document relating to the contract. The document relating to the contract is stored in the contract storage unit 202 in a file format corresponding to a file system of the contract storage unit 202.

The destination information storage unit 203 stores destination information indicating a destination to which the document relating to the contract managed by the contract management unit 22 is transmitted. The destination information is stored in a destination information table stored in the destination information storage unit 203.

The setting information storage unit 204 stores setting information representing the contents of the various settings performed by the contract setting unit 222. The setting information is stored in a setting information table stored in the setting information storage unit 204.

Functional Configuration of User Terminal

Figure 6:
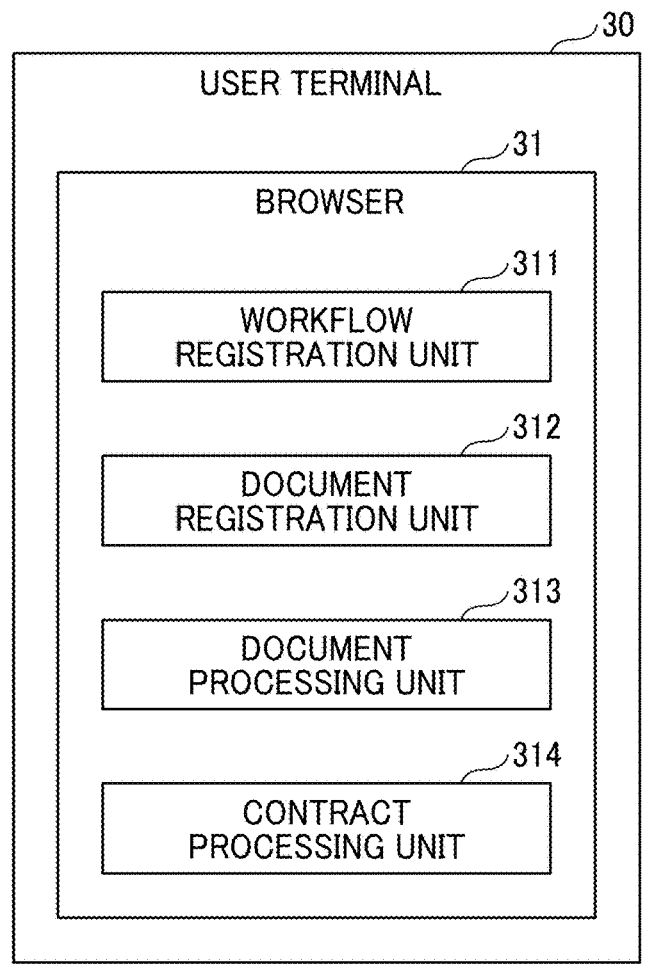
FIG. 6 is a block diagram illustrating a functional configuration of a user terminal according to the first embodiment of the present disclosure.

FIG. 6 is a block diagram illustrating an example of a functional configuration of the user terminal 30 according to the present embodiment. As illustrated in FIG. 6, the user terminal 30 according to the present embodiment includes the browser 31. The browser 31 includes a workflow registration unit 311, a document registration unit 312, a document processing unit 313, and a contract processing unit 314.

The browser 31 included in the user terminal 30 is implemented by, for example, the CPU 501 illustrated in FIG. 2 executing a program loaded to the RAM 503 from the HD 504.

The browser 31 requests the screen information from the screen information providing unit 11 included in the document management server 10, and displays the screen for operating the document management server 10 based on the screen information received from the screen information providing unit 11. Also, the browser 31 requests the screen information from the screen information providing unit 21 included in the electronic contract server 20, and displays the screen for operating the electronic contract server 20 based on the screen information received from the screen information providing unit 21.

The workflow registration unit 311, the document registration unit 312, and the document processing unit 313 are implemented by the browser 31 executing the screen information received from the screen information providing unit 11. Also, the contract processing unit 314 is implemented by the browser 31 executing the screen information received from the screen information providing unit 21.

Although the workflow registration unit 311 is implemented by the browser 31 executing the screen information received from the screen information providing unit 11 in the present embodiment, the method to implement the workflow registration unit 311 is not limited thereto. The workflow registration unit 311 may be implemented as a dedicated application installed in the user terminal 30.

The workflow registration unit 311 transmits a request for setting workflow information to the document management server 10 in response to a user operation on a workflow setting screen. The workflow setting screen is a screen for inputting the workflow information to be registered in the document management server 10. Details of the workflow setting screen are described later.

The document registration unit 312 transmits a request for registering a document to the document management server 10 in response to a user operation on a document registration screen. The document registration screen is a screen for inputting the document to be registered in the document management server 10. Details of the document registration screen are described later.

In addition, the document registration unit 312 transmits a request for setting metadata for the document to the document management server 10 in response to a user operation on a metadata setting screen. The metadata setting screen is a screen for inputting metadata to be set for the document. Details of the metadata setting screen are described later.

The document processing unit 313 transmits a request for processing a task for the document to the document management server 10 in response to a user operation on a task processing screen. The task processing screen is a screen for processing the task for the document. Details of the task processing screen are described later.

The contract processing unit 314 selects a document relating to a contract in response to a user operation on a contract selection screen. In addition, the contract processing unit 314 adds, changes, or deletes a setting of the document relating to the contract in response to a user operation on a contract setting screen. Further, the contract processing unit 314 displays the contents of the document relating to the contract on a contract confirmation screen. Details of the contract selection screen, the contract setting screen, and the contract confirmation screen are described later.

Functional Configuration of Business Partner Terminal

Figure 7:
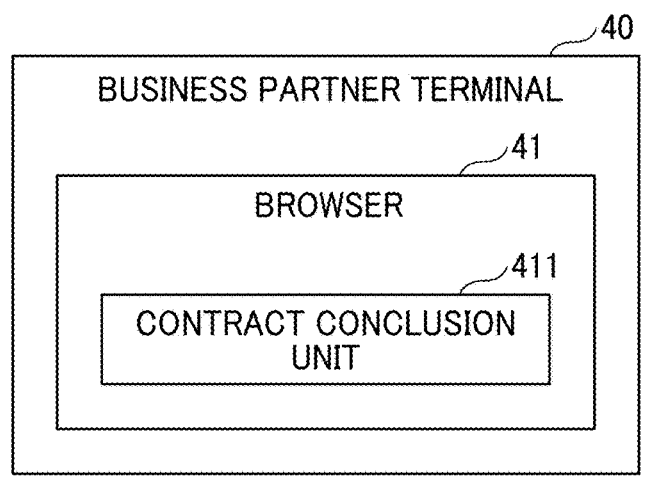
FIG. 7 is a block diagram illustrating a functional configuration of a business partner terminal according to the first embodiment of the present disclosure.

FIG. 7 is a block diagram illustrating an example of a functional configuration of the business partner terminal 40 according to the present embodiment. As illustrated in FIG. 7, the business partner terminal 40 according to the present embodiment includes the browser 41. The browser 41 includes a contract conclusion unit 411.

The browser 41 included in the business partner terminal 40 is implemented by, for example, the CPU 501 illustrated in FIG. 2 executing a program loaded to the RAM 503 from the HD 504.

The browser 41 requests the screen information from the screen information providing unit 21 included in the electronic contract server 20, and displays the screen for operating the electronic contract server 20 based on the screen information received from the screen information providing unit 21.

The contract conclusion unit 411 is implemented by the browser 41 executing the screen information received from the screen information providing unit 21.

The contract conclusion unit 411 transmits an agreement notification for a contract conclusion request to the electronic contract server 20 in response to an operation on a contract conclusion screen by the user at the business partner. Details of the contract conclusion screen are described later.

Figure 8:
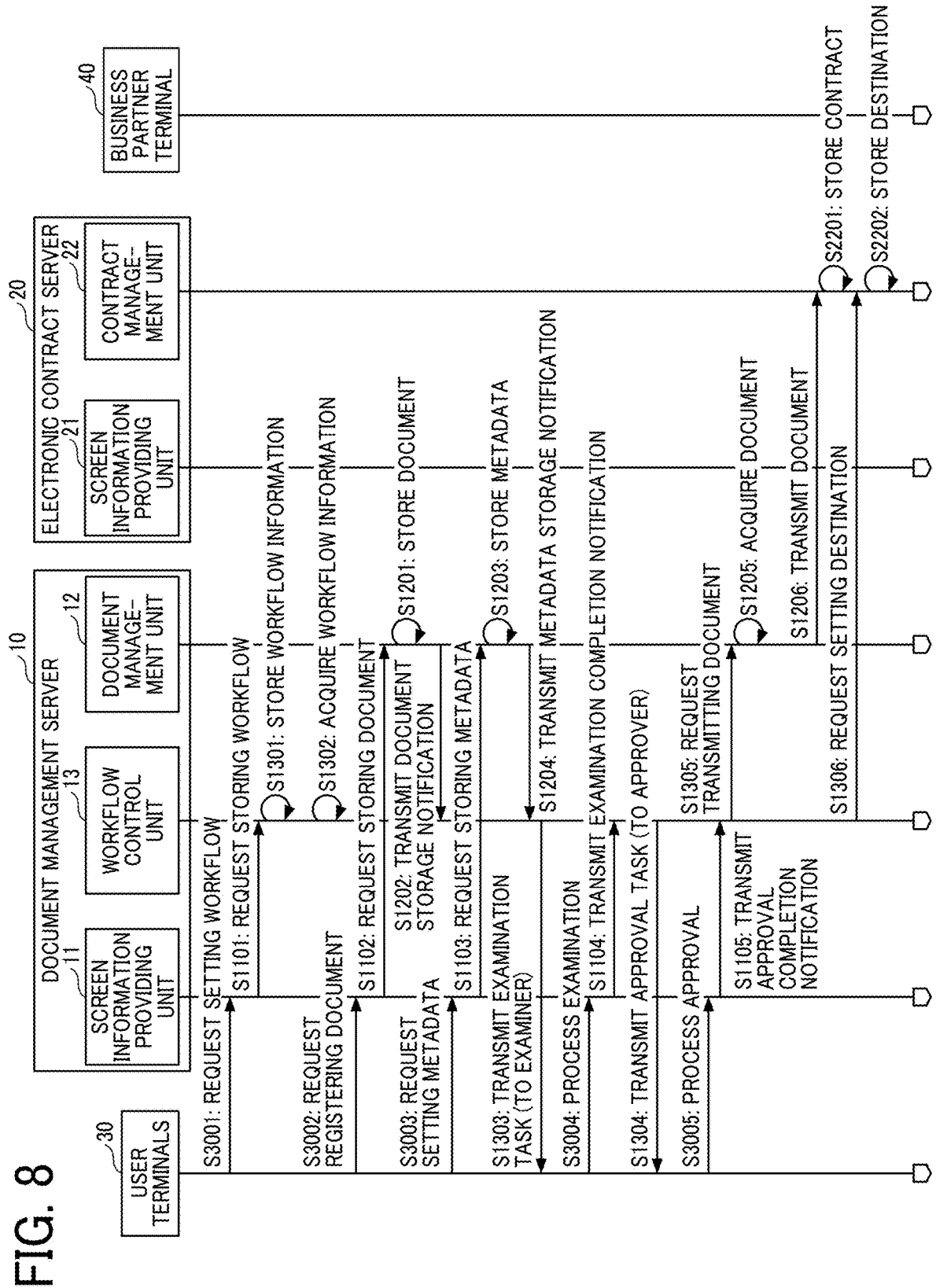
FIG. 8 is a sequence chart illustrating a processing procedure performed by an information processing system according to a comparative example.
Figure 9:
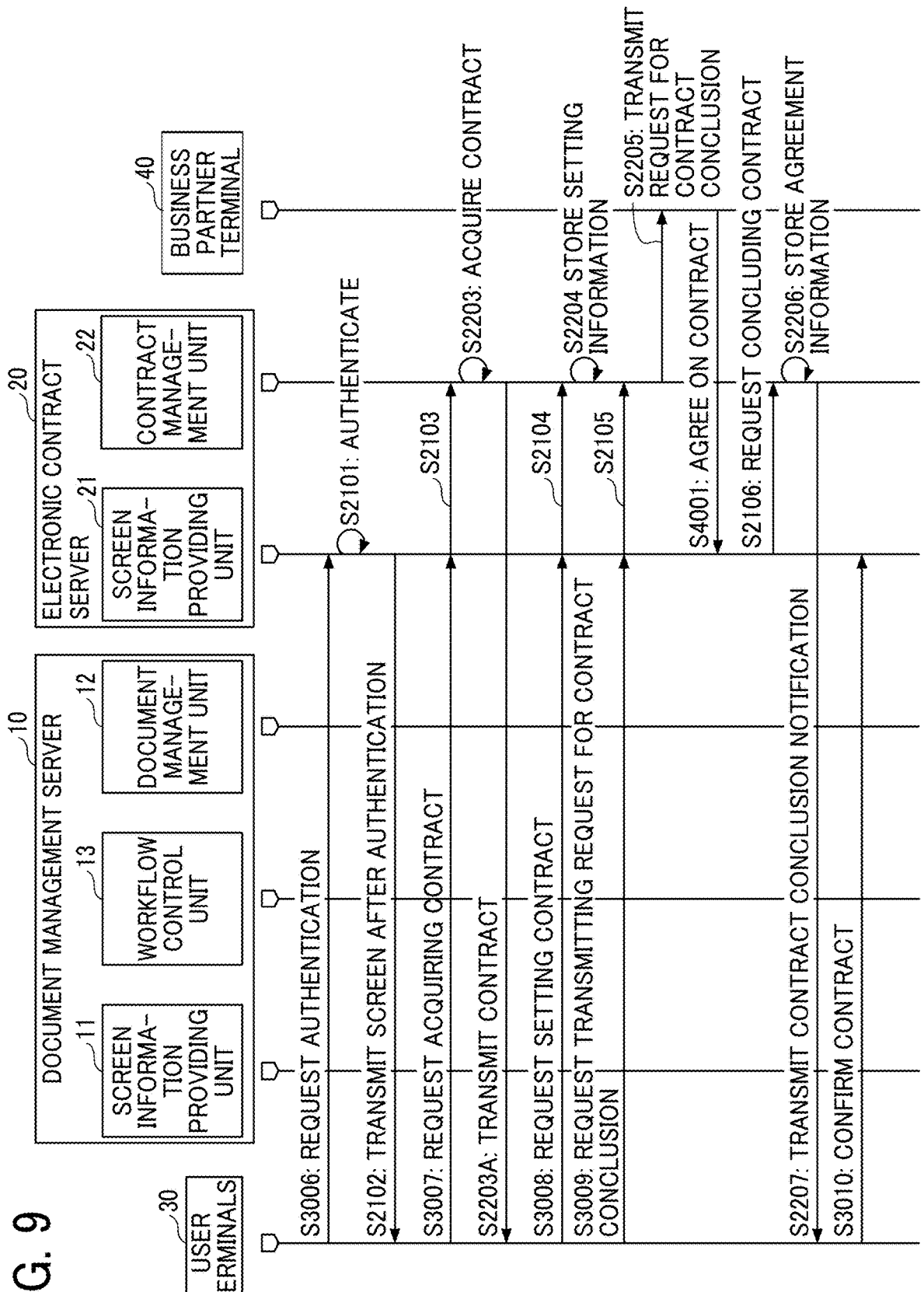
FIG. 9 is a sequence chart illustrating a processing procedure performed by the information processing system according to the comparative example.

A description is given of an example of an information processing method according to a comparative example executed by the information processing system 1 with reference to FIGS. 8 and 9. FIGS. 8 and 9 are sequence charts each illustrating the information processing method according to the comparative example. The processing procedure illustrated in FIG. 9 follows the processing procedure illustrated in FIG. 8.

In S3001, the browser 31 included in the user terminal 30 requests a workflow setting screen (specifically, screen information representing thereof) from the screen information providing unit 11 in response to a user operation. The screen information providing unit 11 transmits the screen information representing the workflow setting screen stored in the screen information storage unit 101 to the browser 31. The browser 31 displays the workflow setting screen based on the screen information received from the screen information providing unit 11. As a result, the workflow registration unit 311 is activated.

In a case where the workflow registration unit 311 is implemented as a dedicated application installed in the user terminal 30, the workflow registration unit 311 is activated in S3001 in response to a user operation on the user terminal 30.

Figure 10:
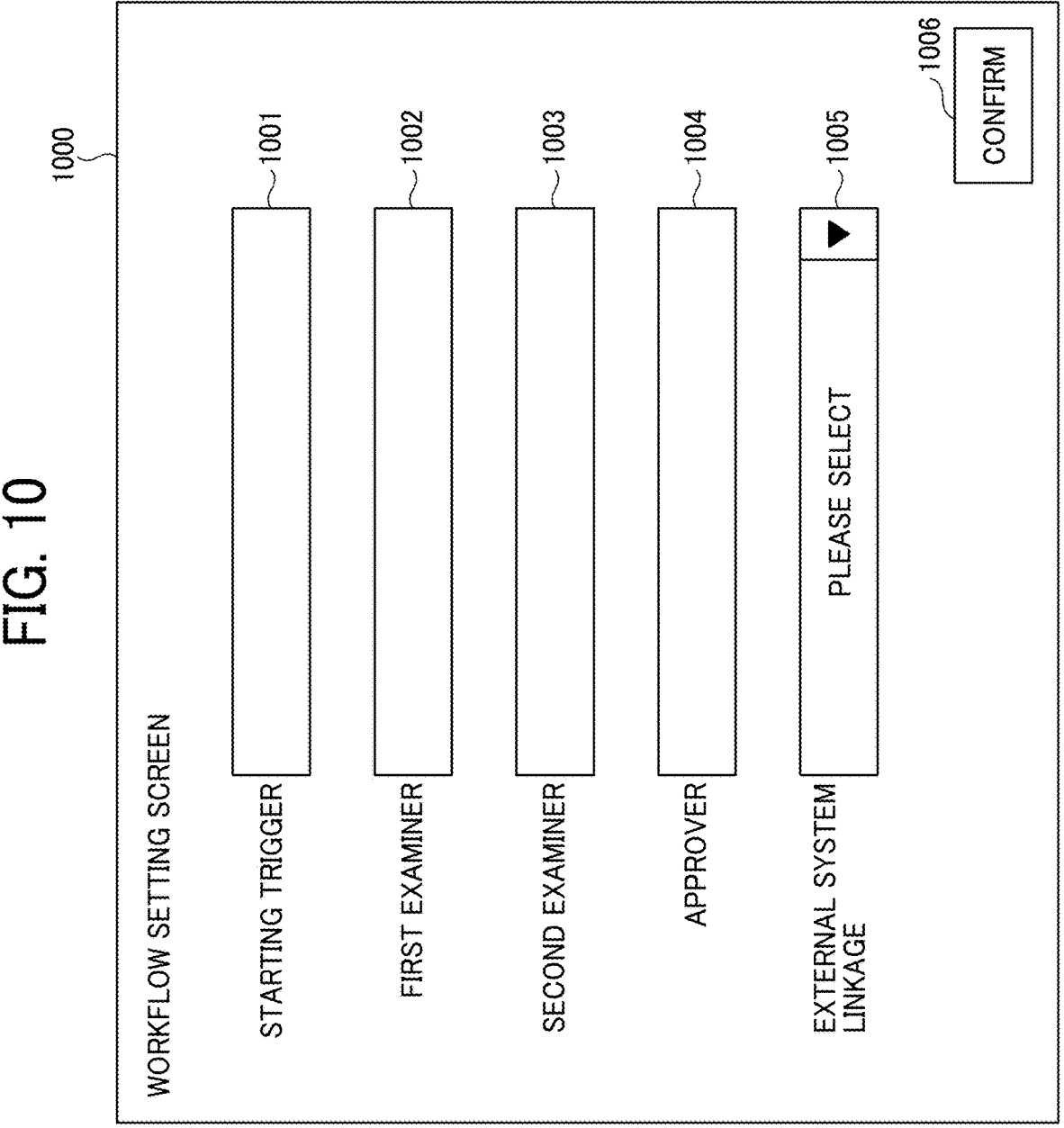
FIG. 10 is a view illustrating an example of a workflow setting screen according to one embodiment of the present disclosure.

Here, a description is given of the workflow setting screen in detail with reference to FIG. 10. FIG. 10 is a view illustrating an example of a workflow setting screen 1000 according to the present embodiment.

As illustrated in FIG. 10, the workflow setting screen 1000 includes a starting trigger input field 1001, a first examiner input field 1002, a second examiner input field 1003, an approver input field 1004, an external system linkage input field 1005, and a confirm button 1006.

The starting trigger input field 1001 receives an input of information representing a trigger to start a workflow. The first examiner input field 1002 receives an input of information representing an examiner who performs examination first in the workflow. The second examiner input field 1003 receives an input of information representing an examiner who performs the examination second in the workflow. The approver input field 1004 receives an input of information representing an approver who performs approval in the workflow. The external system linkage input field 1005 receives an input of information representing an external system when the workflow is executed in cooperation with the external system.

When a user presses the confirm button 1006, the workflow registration unit 311 transmits a request for setting workflow information to the screen information providing unit 11. The request for setting the workflow information indicates the contents input to the starting trigger input field 1001, the first examiner input field 1002, the second examiner input field 1003, the approver input field 1004, and the external system linkage input field 1005.

The user can add an input field in the workflow setting screen 1000, and change and delete each input field included in the workflow setting screen 1000 as desired in accordance with the contents that the user desires to set in the workflow. The user can set the number of procedures included in the workflow as desired.

The structure of the workflow setting screen is not limited to the structure of the workflow setting screen 1000 illustrated in FIG. 10. For example, an intuitive display format such as a flowchart may be employed.

Returning to FIG. 8, the description continues. In S1101, the screen information providing unit 11 receives the request for setting the workflow information from the workflow registration unit 311. Then, the screen information providing unit 11 transmits a request for storing the workflow information to the workflow control unit 13 in response to the request for setting the workflow information.

In S1301, the workflow setting unit 131 included in the workflow control unit 13 receives the request for storing the workflow information from the screen information providing unit 11. Then, the workflow setting unit 131 stores the workflow information in the workflow information storage unit 104 in response to the request for storing the workflow information.

Here, a description is given of the workflow information stored in the workflow information storage unit 104 in detail with reference to FIG. 11. FIG. 11 is a table illustrating an example of a workflow information table 1040 according to the present embodiment.

As illustrated in FIG. 11, the workflow information table 1040 according to the present embodiment includes, as data items, "NO. (NUMBER)," "STARTING TRIGGER," "FLOW 1," "FLOW 2," "FLOW 3," and "FLOW 4."

The number is identification information for identifying workflow information. The starting trigger is information indicating a trigger to start the workflow. The starting trigger may be an event when a particular operation is performed as illustrated in the number 1 of the workflow information or an event when a certain time interval elapses as illustrated in the number 2 of the workflow information.

The flow 1 is information indicating a procedure to be executed first in the workflow. The flow 2 is information indicating a procedure to be executed second in the workflow. The flow 3 is information indicating a procedure to be executed third in the workflow. The flow 4 is information indicating a procedure to be executed fourth in the workflow.

FIGS. 12A and 12B are tables each illustrating another example of the workflow information according to the present embodiment. A workflow information table 1040-1 illustrated in FIG. 12A is a workflow information table including only the contents of each procedure set in the workflow. A workflow information table 1040-2 illustrated in FIG. 12B is a workflow information table including an assignment destination set later in each of particular procedures set in the workflow information table 1040 1.

As described above, the contents and the assignment destination in each procedure may be set simultaneously as illustrated in the workflow information table 1040 of FIG. 11, or the assignment destination may be set later for the contents already set in each of the particular procedures as illustrated in the workflow information tables 1040-1 and 1040-2 of FIGS. 12A and 12B respectively.

FIG. 13 is a table illustrating a specific example of a workflow information table 1041 for implementing the processing procedure illustrated in FIGS. 8 and 9. As illustrated in FIG. 13, the workflow information table 1041 indicates a workflow that starts with a starting trigger, executes flows 1 and 2 in order, and ends with an ending procedure. In this example, the starting trigger is execution of "saving a document and setting metadata (including a destination)," the flows 1 and 2 are execution of "an examination process by an examiner" and "an approval process by an approver" respectively, and the ending procedure is execution of "uploading a document to an electronic contract system and setting destination information."

Returning to FIG. 8, the description continues. In S1302, the workflow acquisition unit 132 included in the workflow control unit 13 acquires the workflow information stored in the workflow information storage unit 104.

In S3002, the browser 31 included in the operator terminal 30-1 requests a document registration screen from the screen information providing unit 11 in response to an operation by the operator. The screen information providing unit 11 transmits screen information representing the document registration screen stored in the screen information storage unit 101 to the browser 31. The browser 31 displays the document registration screen based on the screen information received from the screen information providing unit 11. As a result, the document registration unit 312 is activated.

Here, a description is given of the document registration screen in detail with reference to FIG. 14. FIG. 14 is a view illustrating an example of a document registration screen 2000 according to the present embodiment.

As illustrated in FIG. 14, the document registration screen 2000 includes a file input field 2001, a browse button 2002, and a save button 2003. The file input field 2001 receives an input of information indicating a location of an electronic file corresponding to a document to be registered. The information indicating the location of the electronic file may be an absolute path, a relative path, or information described in a uniform resource identifier (URI) format indicating a file on another apparatus.

When a user presses the browse button 2002, a dialog for selecting a file starts. The user performs an input to the file input field 2001 by selecting a file using the dialog for selecting a file.

When the user presses the save button 2003, the document registration unit 312 transmits a request for registering a document specified by the contents input to the file input field 2001 to the screen information providing unit 11.

Returning to FIG. 8, the description continues. In S1102, the screen information providing unit 11 receives the request for registering the document from the document registration unit 312. Then, the screen information providing unit 11 transmits a request for storing the document to the document management unit 12 in response to the request for registering the document.

In S1201, the document reception unit 121 included in the document management unit 12 receives the request for storing the document from the screen information providing unit 11. Then, the document reception unit 121 stores the document in the document storage unit 102 in response to the request for storing the document. At this time, the document storage unit 102 generates a document identifier (ID) for identifying the document.

In S1202, the document reception unit 121 transmits a document storage notification indicating completion of storage of the document to the workflow control unit 13. The document storage notification includes the document ID.

In S3003, the document registration unit 312 selects one document from documents stored in the document storage unit 102 in response to an operation by the operator. Then, the document registration unit 312 requests a metadata setting screen for setting metadata for the document from the screen information providing unit 11. The screen information providing unit 11 transmits screen information representing the metadata setting screen stored in the screen information storage unit 101 to the browser 31. The browser 31 displays the metadata setting screen based on the screen information received from the screen information providing unit 11.

Here, a description is given of the metadata setting screen in detail with reference to FIG. 15. FIG. 15 is a view illustrating an example of a metadata setting screen 2100 according to the comparative example.

As illustrated in FIG. 15, the metadata setting screen 2100 includes a document type input field 2101, a destination input field 2102, a business partner input field 2103, a contract date input field 2104, a validity period input field 2105, and a confirm button 2106.

The document type input field 2101 receives an input of attribute information indicating the type of document. The destination input field 2102 receives an input of attribute information indicating a destination to which the document is to be sent. The business partner input field 2103 receives an input of attribute information indicating a business partner with which a contract is concluded. The contract date input field 2104 receives an input of attribute information indicating a date of contract conclusion. The validity period input field 2105 receives an input of attribute information indicating a validity period of the contract.

When a user presses the confirm button 2106, the document registration unit 312 transmits a request for setting metadata representing the contents input to the document type input field 2101, the destination input field 2102, the business partner input field 2103, the contract date input field 2104, and the validity period input field 2105 to the screen information providing unit 11.

The user can add an input field in the metadata setting screen 2100, and change and delete each input field included in the metadata setting screen 2100 as desired in accordance with the contents that the user desires to set in the metadata. An input field corresponding to an item not set in the metadata may be left blank.

Returning to FIG. 8, the description continues. In S1103, the screen information providing unit 11 receives the request for setting the metadata from the document registration unit 312. Then, the screen information providing unit 11 transmits a request for storing the metadata to the document management unit 12 in response to the request for setting the metadata. The request for storing the metadata includes the document ID.

In S1203, the metadata setting unit 122 included in the document management unit 12 receives the request for storing the metadata from the screen information providing unit 11. Then, the metadata setting unit 122 stores the metadata in the metadata storage unit 103 in response to the request for storing the metadata.

Here, a description is given of the metadata table stored in the metadata storage unit 103 in detail with reference to FIG. 16. FIG. 16 is a table illustrating an example of a metadata table 1030 according to the comparative example.

As illustrated in FIG. 16, the metadata table 1030 includes, as data items, a document ID, a document type, a destination, a business partner, a contract date, and a validity period.

The document ID is identification information for identifying a document in the document management server 10. In other words, the metadata is associated with the document by the document ID.

In the document type, the contents input to the document type input field 2101 are set. In the destination, the contents input to the destination input field 2102 are set. In the business partner, the contents input to the business partner input field 2103 are set. In the contract date, the contents input to the contract date input field 2104 are set. In the validity period, the contents input to the validity period input field 2105 are set.

A user can add a data item and delete the data item in the metadata table 1030 as desired in accordance with the type of the document. Values may not be set for some data items depending on the type of document. For example, no value is set in the validity period of the document indicated by the document ID "333" in the metadata table 1030 illustrated in FIG. 16.

FIGS. 17A and 17B are tables each illustrating a specific example of the metadata table 1030 according to the comparative example. FIG. 17A is a table illustrating an example of metadata generated when the document reception unit 121 stores a document in the document storage unit 102. As illustrated in FIG. 17A, only the document ID is stored at this timing.

FIG. 17B is a table illustrating an example of the metadata updated when the metadata setting unit 122 stores the metadata in the metadata storage unit 103. As illustrated in FIG. 17B, the metadata input to the metadata setting screen 2100 and the document ID are stored in association with each other at this timing.

Returning to FIG. 8, the description continues. In S1204, the metadata setting unit 122 transmits a metadata storage notification indicating completion of storage of the metadata to the workflow control unit 13. The metadata storage notification includes the document ID.

In S1303, the workflow execution unit 133 included in the workflow control unit 13 transmits an examination task for requesting the examiner to examine the document to the examiner terminal 30-2 according to the workflow information acquired by the workflow acquisition unit 132. The examination task includes the document ID.

The browser 31 included in the examiner terminal 30-2 receives the examination task. The browser 31 requests the task processing screen from the screen information providing unit 11. The screen information providing unit 11 transmits screen information representing the task processing screen stored in the screen information storage unit 101 to the browser 31. The browser 31 displays the task processing screen based on the screen information received from the screen information providing unit 11. As a result, the document processing unit 313 is activated.

Here, a description is given of the task processing screen in detail with reference to FIG. 18. FIG. 18 is a view illustrating an example of a task processing screen 3000 according to the present embodiment.

As illustrated in FIG. 18, the task processing screen 3000 includes a task list display field 3001, a document preview field 3002, an examined button 3003, and a rejected button 3004.

A list of tasks assigned to the examiner is displayed in the task list display field 3001. In the list of tasks, for example, a name and a reception date of a task are displayed. In the document preview field 3002, the contents of a document which is an object of a task selected in the task list display field 3001 is previewed.

The examiner examines the contents of the document on the task processing screen 3000. In completing the examination, the examiner presses the examined button 3003. When the examiner fails to complete the examination, for example, because of detection of a defect or the like, the examiner presses the rejected button 3004.

The buttons included in the task processing screen 3000 differ depending on the contents of a workflow and the type of task. The task processing screen 3000 illustrated in FIG. 18 is an example of a task processing screen when an examination task is transmitted. For example, in a case where an approval task is transmitted, an approved button is displayed instead of the examined button.

When the examiner presses the examined button 3003, the document processing unit 313 transmits an examination completion notification indicating completion of examination of the document to the screen information providing unit 11. In a case where the examiner presses the rejected button, the examination task is rejected and the document is returned to the operator. In the following description, it is assumed that the examiner presses the examined button 3003.

Returning to FIG. 8, the description continues. When the examiner presses the examined button, the document processing unit 313 transmits the examination completion notification of the document to the screen information providing unit 11 in S3004. In S1104, the screen information providing unit 11 receives the examination completion notification of the document from the examiner terminal 30-2. Then, the screen information providing unit 11 transmits an examination completion notification to the workflow control unit 13 in response to the examination completion notification of the document. The examination completion notification includes the document ID.

In S1304, the workflow execution unit 133 included in the workflow control unit 13 transmits an approval task for requesting the approver to approve the document to the approver terminal 30-3 according to the workflow information acquired by the workflow acquisition unit 132. The approval task includes the document ID.

The browser 31 included in the approver terminal 30-3 receives the approval task. The document processing unit 313 displays the task processing screen 3000 for the approver. The approver examines the contents of the document on the task processing screen 3000, and presses the approved button in completing the examination.

When the approver presses the approved button, the document processing unit 313 transmits an approval completion notification indicating approval of the document to the screen information providing unit 11 in S3005.

In S1105, the screen information providing unit 11 receives the approval completion notification of the document from the approver terminal 30-3. Then, the screen information providing unit 11 transmits an approval completion notification to the workflow control unit 13 in response to the approval completion notification of the document. The approval completion notification includes the document ID.

In S1305, the workflow execution unit 133 included in the workflow control unit 13 receives the approval completion notification from the screen information providing unit 11. Then, the workflow execution unit 133 transmits a request for transmitting the document specified by the document ID included in the approval completion notification to the document management unit 12. The request for transmitting the document includes the document ID.

In S1205, the document transmission unit 123 included in the document management unit 12 receives the request for transmitting the document from the workflow execution unit 133. Then, the document transmission unit 123 acquires the document specified by the document ID included in the request for transmitting the document from the document storage unit 102.

In S1206, the document transmission unit 123 transmits the document acquired in S1205 to the electronic contract server 20.

In S2201, the contract reception unit 221 included in the electronic contract server 20 receives the document relating to the contract from the document transmission unit 123. Then, the contract reception unit 221 stores the document relating to the contract in the contract storage unit 202.

In S1306, the workflow execution unit 133 included in the workflow control unit 13 acquires metadata associated with the document specified by the document ID from the metadata storage unit 103 in accordance with the workflow information acquired by the workflow acquisition unit 132. Then, the workflow execution unit 133 transmits a request for setting a destination including the destination included in the metadata to the electronic contract server 20.

In S2202, the contract reception unit 221 included in the electronic contract server 20 determines the destination included in the request for setting the destination received from the workflow execution unit 133 to be a destination of the document relating to the contract stored in the contract storage unit 202. Then, the contract reception unit 221 stores destination information indicating the destination of the document relating to the contract in the destination information storage unit 203.

In the present embodiment, an e-mail address is used as a destination, but the destination is not limited thereto. For example, any destination of communication methods, such as a telephone number, a facsimile number, or accounts of various types of social networking service (SNS), through which a document is electronically transmitted may be set as a destination.

Referring now to FIG. 9, the description continues. In S3006, the browser 31 included in the operator terminal 30-1 transmits a request for authentication from the electronic contract server 20. The request for authentication includes authentication information on the operator. Examples of the authentication information are a user ID for identifying a user and a password input by the user.

In S2101, in response to receiving the request for authentication from the browser 31, the screen information providing unit 21 authenticates the operator based on the authentication information included in the request for authentication.

In S2102, the screen information providing unit 21 transmits screen information representing a screen to be displayed after the authentication based on an authentication result for the operator to the browser 31. In a case where the authentication results in success, the screen displayed after the authentication is the contract selection screen. In a case where the authentication results in unsuccess, the screen displayed after the authentication is an error message screen. In the following description, it is assumed that the screen information providing unit 21 successfully authenticates the operator.

The browser 31 included in the operator terminal 30-1 displays the contract selection screen based on the screen information received from the screen information providing unit 21. As a result, the contract processing unit 314 is activated.

Here, a description is given of the contract selection screen in detail with reference to FIG. 19. FIG. 19 is a view illustrating an example of a contract selection screen 4000 according to the present embodiment.

As illustrated in FIG. 19, the contract selection screen 4000 includes a contract list display field 4010 and a status selection field 4020. The contract list display field 4010 includes contract display fields 4011-1 to 4011-6 in which information on each contract is displayed. Hereinafter, the contract display fields 4011-1 to 4011-6 are collectively referred to as contract display fields 4011, and one thereof is referred to as a contract display field 4011. The status selection field 4020 includes status selection buttons 4021-1 to 4021-6 corresponding to respective preset statuses. Hereinafter, the status selection buttons 4021-1 to 4021-6 are collectively referred to as status selection buttons 4021, and one thereof is referred to as a status selection button 4021.

When the operator presses one of the status selection buttons 4021 in the status selection field 4020, the contract display fields 4011 corresponding to the contracts in the status selected by the one of the status selection buttons 4021 are displayed in the contract list display field 4010. In the example of FIG. 19, six contract display fields 4011 are displayed. The number of contract display fields 4011 displayed in the contract list display field 4010 varies depending on the number of contracts in the selected status.

In the present embodiment, it is assumed that an initial state of the contract selection screen 4000 is displayed when the status selection button 4021-4 corresponding to a status of "CONCLUDED" is pressed. In other words, a list of contracts that have been concluded is displayed in the contract list display field 4010. Note that the initial state to be displayed may be freely determined.

When the operator selects one of the contract display fields 4011 in the contract list display field 4010, the contract processing unit 314 transmits a request for acquiring a document relating to the contract corresponding to the status selected by the one of the contract display fields 4011 to the screen information providing unit 21. The request for acquiring the document includes the document ID.

Returning to FIG. 9, the description continues. In S3007, the contract processing unit 314 transmits the request for acquiring the document to the screen information providing unit 21. In S2103, in response to receiving the request for acquiring the document from the contract processing unit 314, the screen information providing unit 21 transfers the request for acquiring the document to the contract management unit 22.

In 52203, in response to receiving the request for acquiring the document from the screen information providing unit 21, the contract transmission unit 223 included in the contract management unit 22 acquires the document specified by the document ID from the document storage unit 102. In S2203A, the contract transmission unit 223 transmits the document acquired from the document storage unit 102 to the operator terminal 30-1.

In S3008, the contract processing unit 314 included in the operator terminal 30-1 receives the document from the contract transmission unit 223. Then, the browser 31 included in the operator terminal 30-1 requests the contract setting screen from the screen information providing unit 21. The screen information providing unit 21 transmits screen information representing the contract setting screen stored in the screen information storage unit 201 to the browser 31. The browser 31 displays the contract setting screen based on the screen information received from the screen information providing unit 21.

Here, a description is given of the contract setting screen in detail with reference to FIG. 20. FIG. 20 is a view illustrating an example of a contract setting screen 4100 according to the present embodiment.

As illustrated in FIG. 20, the contract setting screen 4100 includes a destination display field 4101, an input item selection field 4102, a file preview field 4103, and a transmit button 4104.

In the destination display field 4101, a sender and a destination of a document relating to a contract to be set are displayed. The sender is information set in advance, for example, by the operator. The destination is information set in the contract. In the input item selection field 4102, input items to be set in the contract are displayed. In the file preview field 4103, a preview of the contents of the document relating to the contract to be set is displayed.

When the operator selects an input item to be set out of the input items in the input item selection field 4102 and then presses a position where the selected input item is to be placed in the file preview field 4103, the contents of the document relating to the contract in which the selected input item is placed at the position is displayed in the file preview field 4103.

When the operator presses the transmit button 4104, the contract processing unit 314 transmits a request for setting a contract indicating the type and the position of each input item set in the file preview field 4103 to the screen information providing unit 21. The request for setting the contract includes the document ID and setting information indicating the type and the position of each input item.

Returning to FIG. 9, the description continues. In S2104, in response to receiving the request for setting the contract from the contract processing unit 314, the screen information providing unit 21 transfers the request for setting the contract to the contract management unit 22.

In S2204, in response to receiving the request for setting the contract from the screen information providing unit 21, the contract setting unit 222 included in the contract management unit 22 stores the setting information included in the request for setting the contract in the setting information storage unit 204.

In S3009, the browser 31 included in the operator terminal 30-1 transmits a request for transmitting a contract conclusion request to the screen information providing unit 21 in response to an operation by the operator. The request for transmitting the contract conclusion request includes the document ID for identifying the document relating to the contract.

In S2105, in response to receiving the request for transmitting the contract conclusion request from the browser 31, the screen information providing unit 21 transfers the request for transmitting the contract conclusion request to the contract management unit 22.

In S2205, in response to receiving the request for transmitting the contract conclusion request from the screen information providing unit 21, the contract transmission unit 223 included in the contract management unit 22 generates a connection destination identifier of the document specified by the document ID included in the request for transmitting the contract conclusion request. Then, the contract transmission unit 223 transmits the contract conclusion request including the connection destination identifier of the document to the business partner terminal 40.

The contract conclusion request is transmitted by a communication method in accordance with the destination information set in the document relating to the contract to be transmitted. In the present embodiment, the contract conclusion request is transmitted by e-mail in which the connection destination identifier of the document is described. Note that the communication method is not limited to the e-mail. Any communication methods through which a document is transmitted electronically may be used, such as various types of SNS, a short message service, and a facsimile communication.

In S4001, the business partner terminal 40 receives the contract conclusion request from the electronic contract server 20. Then, the browser 41 included in the business partner terminal 40 requests the contract conclusion screen from the screen information providing unit 21 by using the connection destination identifier included in the contract conclusion request in response to an operation by the user at the business partner. The screen information providing unit 21 generates screen information representing the contract conclusion screen by using the connection destination identifier, and transmits the screen information to the browser 41. The browser 41 displays the contract conclusion screen based on the screen information received from the screen information providing unit 21. As a result, the contract conclusion unit 411 is activated.

Figure 21:
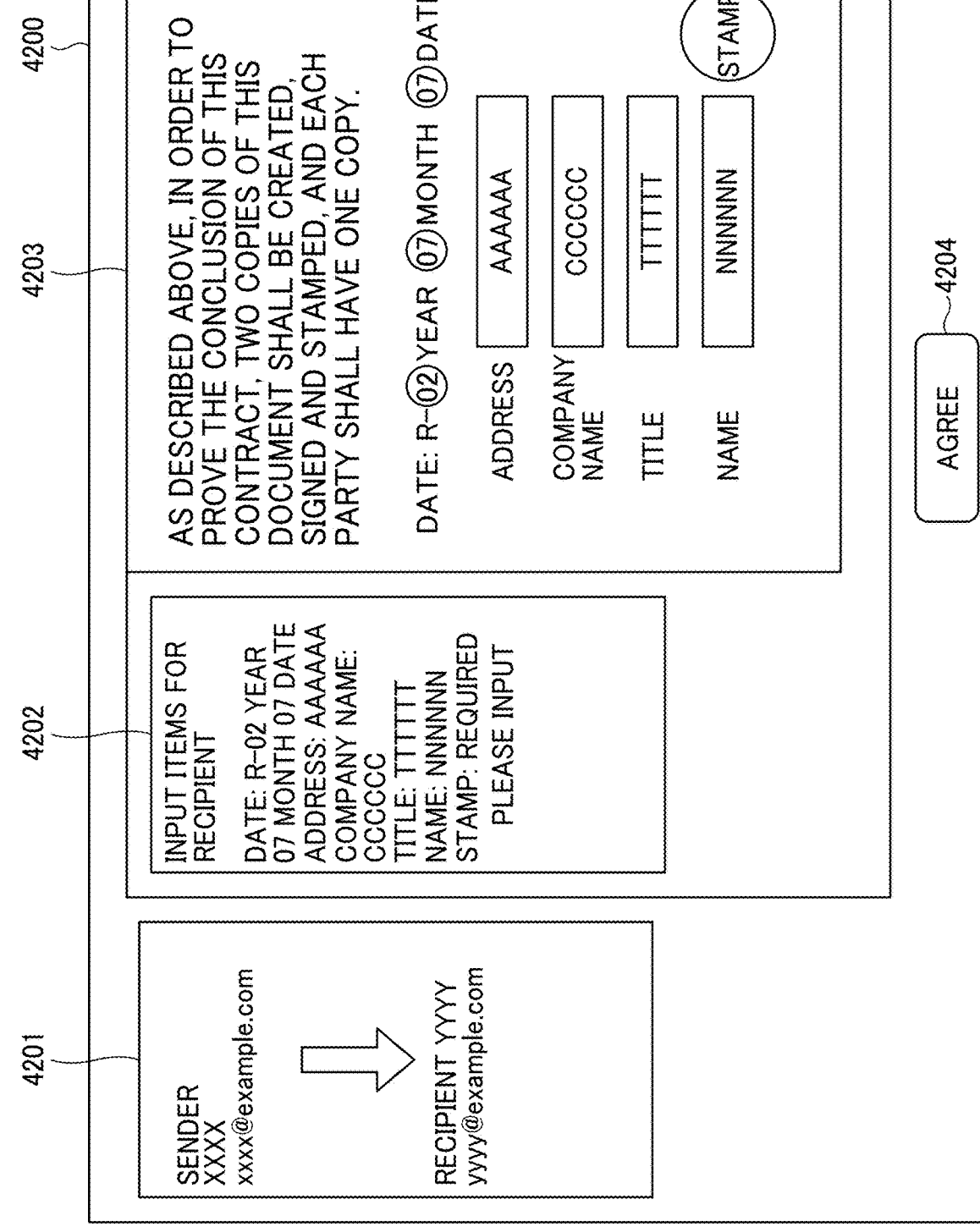
FIG. 21 is a view illustrating an example of a contract conclusion screen according to one embodiment of the present disclosure.

Here, a description is given of the contract conclusion screen in detail with reference to FIG. 21. FIG. 21 is a view illustrating an example of a contract conclusion screen 4200 according to the present embodiment.

As illustrated in FIG. 21, the contract conclusion screen 4200 includes a destination display field 4201, an item input field 4202, a file preview field 4203, and an agree button 4204.

In the destination display field 4201, the sender and the destination of the document relating to the contract to be concluded are displayed. The item input field 4202 receives input contents for input items set in the document relating to the contract. In the file preview field 4203, a preview of the contents of the document relating to the contract in which the input contents in the item input field 4202 are set is displayed.

When the user at the business partner presses the agree button 4204 after inputting the contents in the item input field 4202, the contract conclusion unit 411 transmits a request for concluding the contract indicating the input contents in the item input field 4202 to the screen information providing unit 21. The request for concluding the contract includes the document ID and agreement information indicating the input contents for respective input items.

Returning to FIG. 9, the description continues. In S4001, when the user of the business partner terminal 40 presses the agree button 4204, the contract conclusion unit 411 transmits the request for concluding the contract to the screen information providing unit 21. In S2106, in response to receiving the request for concluding the contract from the contract conclusion unit 411, the screen information providing unit 21 transfers the request for concluding the contract to the contract management unit 22.

In S2206, when the contract management unit 22 receives the request for concluding the contract from the screen information providing unit 21, the contract setting unit 222 included in the contract management unit 22 stores the agreement information included in the request for concluding the contract in the setting information storage unit 204.

In S2207, the contract setting unit 222 transmits a contract conclusion notification including the connection destination identifier of the document specified by the document ID included in the request for concluding the contract to the operator terminal 30-1. In the present embodiment, the contract conclusion notification is transmitted by e-mail in which the connection destination identifier of the document is described. Note that the communication method is not limited to the e-mail. Any communication methods through which a document is transmitted electronically may be used.

In S3010, when the operator terminal 30-1 receives the contract conclusion notification from the electronic contract server 20, the browser 31 included in the operator terminal 30-1 requests the contract confirmation screen to the screen information providing unit 21 by using the connection destination identifier included in the contract conclusion notification in response to an operation by the operator. The screen information providing unit 21 generates screen information representing the contract confirmation screen by using the connection destination identifier, and transmits the screen information to the browser 31. The browser 31 displays the contract confirmation screen based on the screen information received from the screen information providing unit 21.

Figure 22:
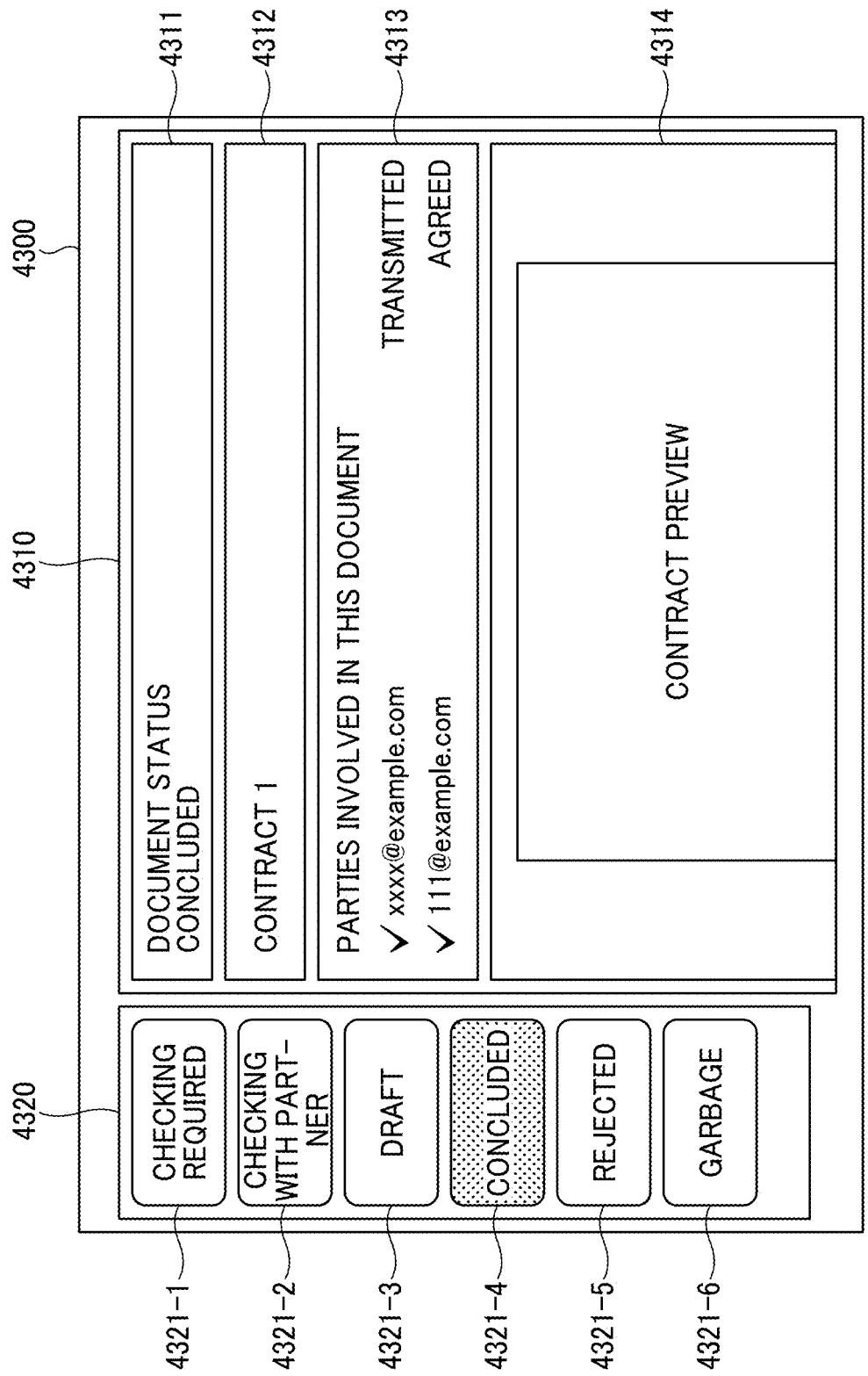
FIG. 22 is a view illustrating an example of a contract confirmation screen according to one embodiment of the present disclosure.

Here, a description is given of the contract confirmation screen in detail with reference to FIG. 22. FIG. 22 is a view illustrating an example of a contract confirmation screen 4300 according to the present embodiment.

As illustrated in FIG. 22, the contract confirmation screen 4300 includes a contract detail display field 4310 and a status selection field 4320. The contract details display field 4310 includes a status display field 4311, a contract name display field 4312, an involved party display field 4313, and a contract preview field 4314.

In the status display field 4311, the status of the contract to be confirmed is displayed. In the contract name display field 4312, the name of the contract to be confirmed is displayed. In the involved party display field 4313, destinations at the parties involved in the contract to be confirmed and a status of the contract at each destination are displayed. In the contract preview field 4314, a preview of the contents of the document relating to the contract after contract conclusion is displayed.

The status selection field 4320 is the same as the status selection field 4020 included in the contract selection screen 4000 illustrated in FIG. 19. When the operator presses one of the status selection buttons 4321-1 to 4321-6 in the status selection field 4320, a list of contracts whose statuses correspond to the status selected by the one of the status selection buttons 4321-1 to 4321-6 is displayed. When the operator selects one of the contracts in the list of the contracts, information on the selected contract is displayed in the contract detail display field 4310.

Information Processing Method in First Embodiment

Figure 23:
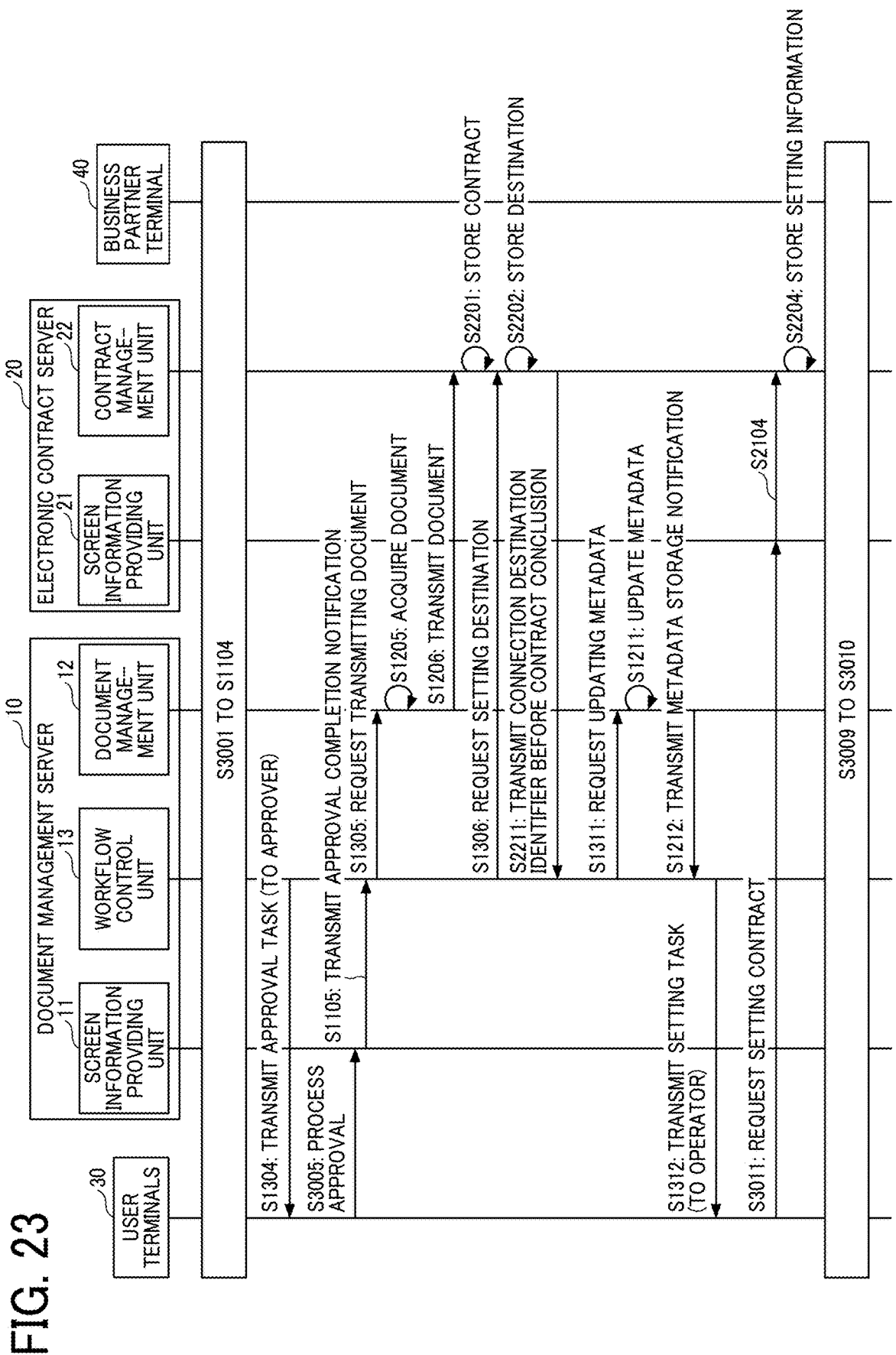
FIG. 23 is a sequence chart illustrating a processing procedure performed by an information processing system according to the first embodiment of the present disclosure.

A description is given of an example of an information processing method according to the first embodiment executed by the information processing system 1 with reference to FIG. 23. FIG. 23 is a sequence chart illustrating the information processing method according to the first embodiment.

FIG. 24 is a table illustrating a specific example of workflow information for implementing the processing procedure illustrated in FIG. 23. As illustrated in FIG. 24, a workflow information table 1042 according to the present embodiment indicates a workflow that starts with a starting trigger, executes flows 1 to 4 in order, and ends with an ending procedure. In this example, the starting trigger is execution of "saving a document and setting metadata (including a destination)," the flows 1 to 4 are execution of "an examination process by an examiner," "an approval process by an approver," "uploading a document to the electronic contract system and setting destination information," and "acquiring a processing result from the electronic contract system" respectively, and the ending procedure is execution of "a document process by an operator."

Returning to FIG. 23, the description continues. The processing of S3001 to S2202 is the same as the processing executed by the information processing system 1 illustrated in FIG. 8 according to the comparative example.

In S2211, the identification information transmission unit 224 included in the contract management unit 22 generates a connection destination identifier (a first connection destination identifier) of the document relating to the contract stored in the contract storage unit 202 in S2201. Then, the identification information transmission unit 224 transmits the connection destination identifier of the document relating to the contract to the document management server 10.

At the time of S2211, the contract conclusion request has not been transmitted to the business partner. Accordingly, the connection destination identifier generated by the identification information transmission unit 224 is an identifier for identifying the document relating to the contract before contract conclusion. Hereinafter, the connection destination identifier generated in S2211 is also referred to as a "connection destination identifier before contract conclusion."

In S1311, when the identification information acquisition unit 134 included in the document management server 10 receives the connection destination identifier before contract conclusion from the electronic contract server 20, the workflow execution unit 133 included in the document management server 10 transmits a request for storing identification information to the document management unit 12. The request for storing the identification information includes the document ID and the connection destination identifier before contract conclusion.

In S1211, when the document management unit 12 receives the request for storing the identification information from the workflow execution unit 133, the metadata setting unit 122 included in the document management unit 12 updates the metadata stored in the metadata storage unit 103 so that the connection destination identifier before contract conclusion is included in the metadata associated with the document ID included in the request for storing the identification information.

Here, a description is given of a metadata table according to the present embodiment in detail with reference to FIGS. 25A, 25B, and 25C. FIGS. 25A, 25B, and 25C are tables each illustrating a specific example of a metadata table 1031 according to the present embodiment.

As illustrated in FIGS. 25A, 25B, and 25C, the metadata table 1031 according to the present embodiment includes, as data items, a document ID, a document type, a destination, a business partner, a contract date, and a validity period similar to the metadata table 1030 illustrated in FIG. 16, and further includes a URL of a document before contract conclusion.

The URL of a document before contract conclusion is a connection destination identifier before contract conclusion included in the request for storing identification information. In other words, the metadata table 1031 according to the preset embodiment differs from the metadata table 1030 illustrated in FIG. 16 in that the connection destination identifier before contract conclusion is added.

FIG. 25A is a table illustrating an example of the metadata generated when the document reception unit 121 stores the document in the document storage unit 102. As illustrated in FIG. 25A, only the document ID of the document is stored at this timing.

FIG. 25B is a table illustrating an example of the metadata updated when the metadata setting unit 122 stores the metadata in the metadata storage unit 103. As illustrated in FIG. 25B, the metadata input to the metadata setting screen 2100 and the document ID are stored in association with each other at this timing.

FIG. 25C is a table illustrating an example of the metadata when the metadata setting unit 122 updates the metadata so that the connection destination identifier before contract conclusion is included in the metadata. As illustrated in FIG. 25C, the connection destination identifier before contract conclusion received from the identification information transmission unit 224 and the document ID are stored in association with each other at this timing.

Returning to FIG. 23, the description continues. In S1212, the metadata setting unit 122 transmits a metadata storage notification indicating completion of storage of the metadata to the workflow control unit 13. The metadata storage notification includes the document ID.

In S1312, the workflow execution unit 133 included in the workflow control unit 13 transmits a setting task for requesting the operator to set the contract to the operator terminal 30-1 according to the workflow information acquired by the workflow acquisition unit 132. The setting task includes the document ID.

In S3011, the contract processing unit 314 included in the operator terminal 30-1 receives the setting task from the workflow execution unit 133. Then, the browser 31 included in the operator terminal 30-1 requests a metadata setting screen relating to the document specified by the document ID included in the setting task from the screen information providing unit 11 in response to an operation by the operator. The screen information providing unit 11 transmits screen information representing the metadata setting screen stored in the screen information storage unit 101 to the browser 31. The browser 31 displays the metadata setting screen based on the screen information received from the screen information providing unit 11.

Here, a description is given of the metadata setting screen in detail with reference to FIG. 26. FIG. 26 is a view illustrating an example of a metadata setting screen 2110 according to the present embodiment.

As illustrated in FIG. 26, the metadata setting screen 2110 according to the present embodiment includes the document type input field 2101, the destination input field 2102, the business partner input field 2103, the contract date input field 2104, the validity period input field 2105, and the confirm button 2106 similar to the metadata setting screen 2100 illustrated in FIG. 15, and further includes a document before contract conclusion display field 2111.

The connection destination identifier before contract conclusion set in the URL of a document before contract conclusion included in the metadata table 1031 is displayed in the document before contract conclusion display field 2111. In other words, the metadata setting screen 2110 according to the preset embodiment differs from the metadata setting screen 2100 illustrated in FIG. 15 in that the connection destination identifier before contract conclusion is added.

The browser 31 included in the operator terminal 30-1 requests a contract setting screen from the screen information providing unit 21 by using the connection destination identifier before contract conclusion in response to an operation by the operator on the metadata setting screen 2110. The screen information providing unit 21 generates screen information representing the contract setting screen by using the connection destination identifier before contract conclusion and transmits the screen information to the browser 31. The browser 31 displays the contract setting screen based on the screen information received from the screen information providing unit 21.

The operation of displaying the contract setting screen from the metadata setting screen 2110 is, for example, clicking the URL of a document before contract conclusion on the metadata setting screen 2110.

In the contract setting screen according to the present embodiment, the document relating to the contract to be set is directly displayed by using the connection destination identifier before contract conclusion. In the processing procedure according to the comparative example executed by the information processing system 1, it is necessary to select the contract to be set on the contract selection screen in order to display the contract setting screen (see the processing of S3007 to S2203A in FIG. 9).

Thereafter, similar to the processing procedure according to the comparative example illustrated in FIG. 9, the information processing system 1 executes the processing of S2104 to S3010 illustrated in FIG. 23.

The information processing system 1 according to the present embodiment stores a document managed by the document management server 10 and a connection destination identifier that identifies the document in the electronic contract server 20 in association with each other, and outputs screen information representing the connection destination identifier and information on the document in association with each other to the user terminal 30.

Thus, a user can operate the document management server 10 to directly display the document stored in the electronic contract server 20 based on the connection destination identifier displayed on the screen output by the document management server 10. Accordingly, when the user desires to confirm the contents of the document stored in the electronic contract server 20, the information processing system 1 according to the present embodiment saves the user logging into the electronic contract server 20 each time and searching for a desired document among many documents stored in the electronic contract server 20.

Second Embodiment

In the first embodiment, in response to receiving a document from the document management server 10, the electronic contract server 20 transmits a connection destination identifier for identifying the document relating to a contract before contract conclusion to the document management server 10. The document management server 10 stores the connection destination identifier received from the electronic contract server 20 in metadata associated with the document.

In the second embodiment, the document management server 10 acquires a connection destination identifier for identifying a document relating to a contract from the electronic contract server 20 at certain time intervals. The document management server 10 stores the connection destination identifier corresponding to each status of the contract (for example, a status before contract conclusion or after contract conclusion) in metadata associated with the document.

Information Processing Method in Second Embodiment

Figure 27:
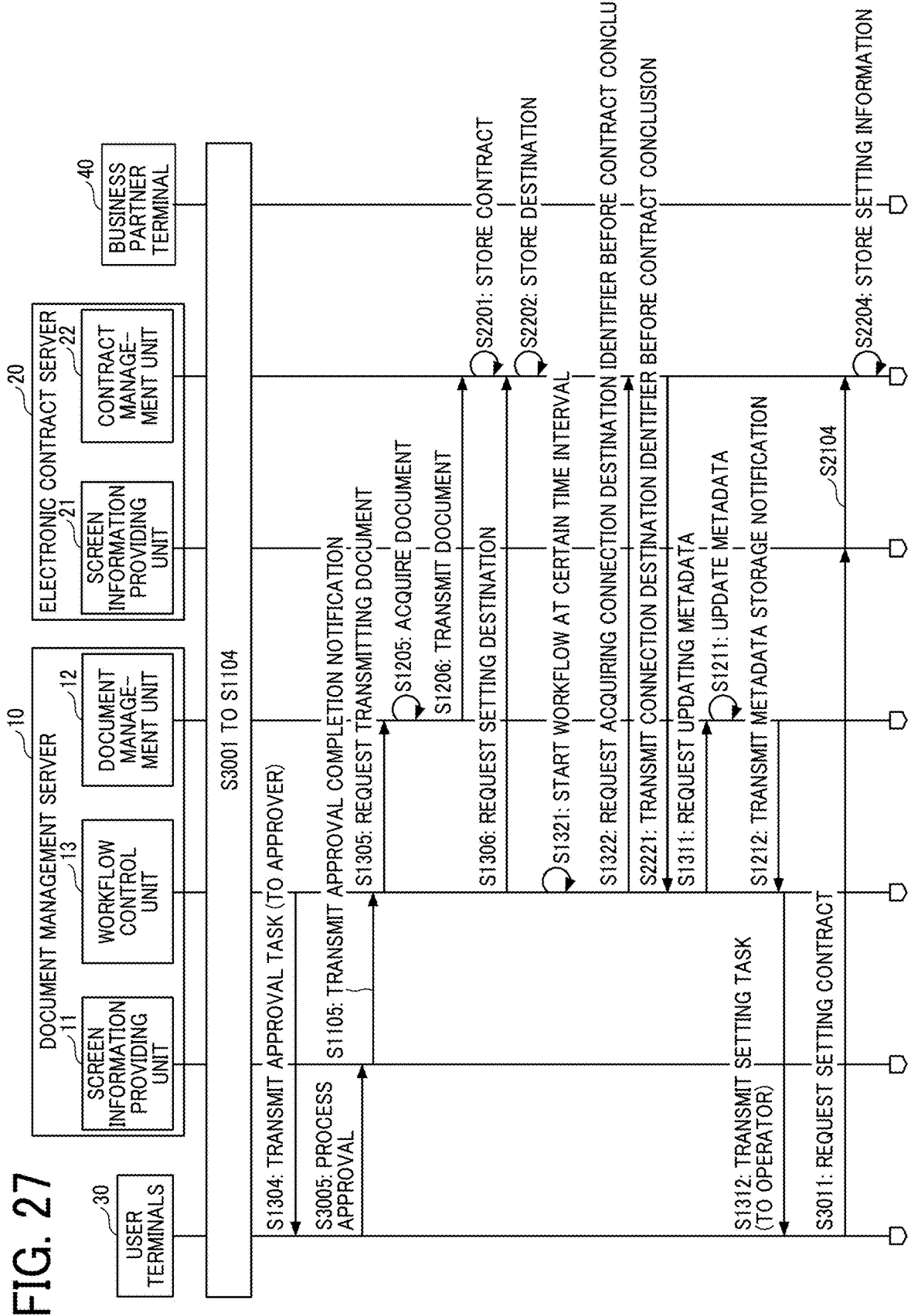
FIG. 27 is a sequence chart illustrating a processing procedure performed by the information processing system according to a second embodiment of the present disclosure.

A description is given of an example of an information processing method according to the second embodiment executed by the information processing system 1 with reference to FIGS. 27 and 28. FIGS. 27 and 28 are sequence charts each illustrating the information processing method according to the present embodiment. The processing procedure illustrated in FIG. 28 follows the processing procedure illustrated in FIG. 27.

FIG. 29 is a table illustrating a specific example of workflow information for implementing the processing procedure illustrated in FIGS. 27 and 28. As illustrated in FIG. 29, a workflow information table 1043 according to the present embodiment indicates a workflow that starts with a starting trigger, executes flows 1 to 7 in order, and ends with an ending procedure. In this example, the starting trigger is execution of "saving a document and setting metadata (including a destination)." The flows 1 to 7 are execution of "an examination process by an examiner," "an approval process by an approver," "uploading a document to the electronic contract system and setting destination information," "acquiring a processing result from the electronic contract system," "a document process by an operator," "acquiring document information from the electronic contract system (execution periodically)," and "transmitting a contract conclusion notification to the approver" respectively. The ending procedure is execution of "confirming a document after contract conclusion by the approver."

Returning to FIG. 27, the description continues. The processing of S3001 to S2202 is the same as the processing executed by the information processing system 1 illustrated in FIG. 23 according to the first embodiment.

In S1321, the workflow execution unit 133 included in the workflow control unit 13 starts a workflow with the elapse of a certain time interval as a starting trigger in accordance with the workflow information acquired by the workflow acquisition unit 132.

In S1322, the identification information acquisition unit 134 included in the workflow control unit 13 transmits a request for acquiring the connection destination identifier to the electronic contract server 20.

In S2221, in response to receiving the request for acquiring the connection destination identifier from the identification information acquisition unit 134, the identification information transmission unit 224 included in the contract management unit 22 generates a connection destination identifier for the document relating to the contract before contract conclusion of which connection destination identifier has not been transmitted, and transmits the generated connection destination identifier to the identification information acquisition unit 134.

The connection destination identifier generated by the identification information transmission unit 224 in S2221 is a connection destination identifier before contract conclusion for identifying the document relating to the contract before contract conclusion.

In addition, the connection destination identifier before contract conclusion transmitted by the identification information transmission unit 224 in S2221 is the connection destination identifier for the document relating to the contract not yet concluded and is newly received from the document management server 10 after the previous execution of the processing in S2221. Accordingly, the identification information transmission unit 224 may transmit a plurality of connection destination identifiers before contract conclusion in some cases and may not transmit any connection destination identifier before contract conclusion in other cases.

The processing of S1311 to S2204 is the same as the processing executed by the information processing system 1 illustrated in FIG. 23 according to the first embodiment.

Returning to FIG. 28, the description continues. The processing of S3009 to S2206 is the same as the processing executed by the information processing system 1 illustrated in FIG. 9 according to the comparative example.

In S1323A, the identification information acquisition unit 134 included in the workflow control unit 13 transmits a request for acquiring the connection destination identifier to the electronic contract server 20.

In S2222, in response to receiving the request for acquiring the connection destination identifier from the identification information acquisition unit 134, the identification information transmission unit 224 included in the contract management unit 22 generates a connection destination identifier (a second connection destination identifier) for the document relating to the contract after contract conclusion of which connection destination identifier has not been transmitted, and transmits the generated connection destination identifier to the identification information acquisition unit 134.

The connection destination identifier generated by the identification information transmission unit 224 in S2222 is a connection destination identifier for identifying the document relating to the contract alter contract conclusion. Hereinafter, the connection destination identifier generated in S2222 is also referred to as a "connection destination identifier after contract conclusion."

In addition, the connection destination identifier after contract conclusion transmitted by the identification information transmission unit 224 in S2222 is the connection destination identifier for the document relating to the concluded contract on which the agreement information is newly received from the business partner terminal 40 after the previous execution of the processing S2222. Accordingly, the identification information transmission unit 224 may transmit a plurality of connection destination identifiers after contract conclusion in some cases and may not transmit any connection destination identifier after contract conclusion in other cases.

In S1323A, when the identification information acquisition unit 134 included in the document management server 10 receives the connection destination identifier after contract conclusion from the electronic contract server 20, the workflow execution unit 133 transmits a request for storing identification information to the document management unit 12. The request for storing the identification information includes the document ID and the connection destination identifier after contract conclusion.

In S1221, in response to receiving the request for storing the identification information from the workflow execution unit 133, the metadata setting unit 122 included in the document management unit 12 updates the metadata stored in the metadata storage unit 103 so that the connection destination identifier after contract conclusion is included in the metadata associated with the document ID included in the request for storing the identification information.

Here, a description is given of a metadata table according to the present embodiment in detail with reference to FIGS. 30A and 30B. FIGS. 30A and 30B are tables each illustrating a specific example of a metadata table 1032 according to the present embodiment.

As illustrated in FIGS. 30A and 30B, the metadata table 1032 according to the present embodiment includes, as data items, a document ID, a document type, a destination, a business partner, a contract date, a validity period, and a URL of a document before contract conclusion similar to the metadata table 1031 illustrated in FIGS. 25A, 25B, and 25C, and further includes a URL of a document after contract conclusion.

The URL of a document after contact conclusion is the connection destination identifier after contract conclusion included in the request for storing the identification information. In other words, the metadata table 1032 according to the preset embodiment differs from the metadata table 1031 illustrated in FIGS. 25A, 25B, and 25C in that the connection destination identifier after contract conclusion is added.

FIG. 30A is a table illustrating an example of metadata when the metadata setting unit 122 updates the metadata so that the connection destination identifier before contract conclusion is included in the metadata. As illustrated in FIG. 30A, the connection destination identifier before contract conclusion received from the identification information transmission unit 224 and the document ID are stored in association with each other at this timing.

FIG. 30B is a table illustrating an example of the metadata when the metadata setting unit 122 updates the metadata so that the connection destination identifier after contract conclusion is included in the metadata. As illustrated in FIG. 30B, the connection destination identifier after contract conclusion received from the identification information transmission unit 224 and the document ID are stored in association with each other at this timing.

Returning to FIG. 28, the description continues. In S1324, the workflow execution unit 133 included in the workflow control unit 13 transmits a confirmation task for requesting the approver to confirm the contract after contract conclusion to the approver terminal 30-3 according to the workflow information acquired by the workflow acquisition unit 132. The confirmation task includes the document ID.

In S3021, when the contract processing unit 314 included in the approver terminal 30-3 receives the confirmation task from the workflow execution unit 133, the browser 31 included in the approver terminal 30-3 requests a metadata setting screen relating to the document specified by the document ID included in the confirmation task from the screen information providing unit 11 in response to an operation by the approver. The screen information providing unit 11 transmits screen information representing the metadata setting screen stored in the screen information storage unit 101 to the browser 31. The browser 31 displays the metadata setting screen based on the screen information received from the screen information providing unit 11.

Here, a description is given of the metadata setting screen in detail with reference to FIG. 31. FIG. 31 is a view illustrating an example of a metadata setting screen 2120 according to the present embodiment.

As illustrated in FIG. 31, the metadata setting screen 2120 according to the present embodiment includes the document type input field 2101, the destination input field 2102, the business partner input field 2103, the contract date input field 2104, the validity period input field 2105, the confirm button 2106, and the document before contract conclusion display field 2111 similar to the metadata setting screen 2110 illustrated in FIG. 26, and further includes a document after contract conclusion display field 2121.

The connection destination identifier after contract conclusion set in the URL of a document after contract conclusion included in the metadata table 1032 is displayed in the document after contract conclusion display field 2121. In other words, the metadata setting screen 2120 according to the preset embodiment differs from the metadata setting screen 2110 illustrated in FIG. 26 in that the connection destination identifier after contract conclusion is added.

The browser 31 included in the approver terminal 30-3 requests a contract confirmation screen from the screen information providing unit 21 by using the connection destination identifier after contract conclusion in response to an operation on the metadata setting screen 2120 by the approver. The screen information providing unit 21 generates screen information representing the contract confirmation screen by using the connection destination identifier after contract conclusion, and transmits the screen information to the browser 31. The browser 31 displays the contract confirmation screen based on the screen information received from the screen information providing unit 21.

The operation of displaying the contract confirmation screen from the metadata setting screen 2120 is, for example, an operation of clicking the URL of a document before contract conclusion or the URL of a document after contract conclusion on the metadata setting screen 2120.

In the metadata setting screen according to the present embodiment, the URL of a document before contract conclusion and the URL of a document after contract conclusion are simultaneously displayed. As a result, the contents of the document relating to the contract before contract conclusion and the contents of the document relating to the contract after contract conclusion are directly displayed on the same screen. For example, when a user desires to check the document relating to the contract after contract conclusion in comparison with the document relating to the contract before contract conclusion, this configuration can considerably save time and effort of the user compared with a conventional method, resulting in convenience.

The information processing system 1 according to the present embodiment acquires a connection destination identifier for identifying a document relating to a contract from the electronic contract server 20 at a certain time interval. Accordingly, the document management server 10 stores the connection destination identifier relating to the contract before contract conclusion and the connection destination identifier relating to the contract after contract conclusion in association with each other.

The electronic contract server 20 according to the comparative example transmits a notification indicating completion of contract conclusion of the contract only to the operator terminal 30-1. Accordingly, a person other than the operator has a difficulty to recognize the contract conclusion of the contract. According to the information processing system 1 of the present embodiment, the document including the connection destination identifier after contract conclusion indicates that the contract is concluded. Accordingly, a person other than the operator can recognize the contract conclusion of the contract.

In addition, the connection destination identifier before contract conclusion and the connection destination identifier after contract conclusion are associated with each other. Thus, when a user desires to compare the document relating to the contract after contract conclusion with the document relating to the contract before contract conclusion, the user can smoothly check both the documents.

In each of the above-described embodiments, the document management server 10 is an example of a first information processing apparatus. The electronic contract server 20 is an example of a second information processing apparatus. The document is an example of electronic data. The document transmission unit 123 is an example of a transmission unit. The identification information transmission unit 224 is an example of a generating unit that generates information or data. The browser 31 is an example of screen display software. The processing of S1206 executed by the document transmission unit 123 is an example of a transmission procedure. The processing of S1311 executed by the identification information acquisition unit 134 is an example of an acquisition procedure. The processing of S3011 executed by the screen information providing unit 11 is an example of a providing procedure.

Each of the functions of the above-described embodiment may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The apparatuses or devices described in the above-described embodiments are merely one example of the plural computing environments that implement the embodiments disclosed herein. In some embodiments, each of the document management server 10 and the electronic contract server 20 includes a plurality of computing devices, such as a server cluster. The plurality of computing devices communicates with one another through any type of communication link including, for example, a network or a shared memory, and performs the operations described in the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

One aspect of the present disclosure provides an information processing method performed by a computer. The method includes transmitting electronic data received from a user terminal to another information processing apparatus via a network, the electronic data to be processed by the information processing apparatus, acquiring identification information of the electronic data stored by the another information processing apparatus from the another information processing apparatus, and transmitting, to the user terminal, screen information representing a screen for requesting the electronic data including the identification information received from the another information processing apparatus.

The invention claimed is:

1. An information processing apparatus, comprising:
   circuitry configured to:
   receive electronic data from a user terminal, the electronic data to be processed by the information processing apparatus;
   transmit the electronic data to another information processing apparatus via a network;
   acquire identification information of the electronic data from the another information processing apparatus at certain time intervals;
   transmit, to the user terminal, screen information representing a screen that associates, with the identification information, setting information of electronic contract processing to be executed on the electronic data by the another information processing apparatus;
   acquire, from the another information processing apparatus in response to receiving an operation on the screen displayed by the user terminal, the setting information of the electronic data based on the identification information; and
   transmit, to the another information processing apparatus, contents of the setting information input from the user terminal through the screen.

2. The information processing apparatus according to claim 1, wherein:
   the screen is a screen for inputting metadata to be associated with the electronic data; and the circuitry is configured to receive the metadata from the user terminal, and include the identification information in the metadata.

3. The information processing apparatus according to claim 2, wherein:
the circuitry is configured to receive the identification information, which is generated by the another information processing apparatus, from the another information processing apparatus.

4. The information processing apparatus according to claim 3, wherein:
the circuitry is configured to receive the identification information generated each time the another information processing apparatus stores the electronic data.

5. The information processing apparatus according to claim 1, wherein the identification information includes:
first identification information for identifying the electronic data before the another information processing apparatus processes the electronic data; and
second identification information for identifying the electronic data after the another information processing apparatus processes the electronic data.

6. The information processing apparatus according to claim 1, wherein the circuitry is further configured to:
store, in a memory, second identification information of the electronic data in response to reception of the electronic data from the user terminal; and
store, in the memory, the identification information received from the another information processing apparatus in association with metadata including the second identification information.

7. The information processing apparatus according to claim 1, wherein the another information processing apparatus is configured to process the electronic data and generate the identification information.

8. The information processing apparatus according to claim 1, wherein the electronic data includes content of a document.

9. The information processing apparatus according to claim 1, wherein the identification information is associated with the electronic data.

10. The information processing apparatus according to claim 1, wherein the identification information includes a connection destination identifier for identifying a connection destination of the electronic data.

11. The information processing apparatus according to claim 8, wherein the identification information includes a connection destination identifier for identifying a connection destination of the document.

12. An information processing system, comprising:
a first information processing apparatus;
a second information processing apparatus; and
a user terminal, wherein:
the first information processing apparatus, the second information processing apparatus, and the user terminal are configured to be communicable with one another via a network;
the first information processing apparatus includes first circuitry configured to:
receive electronic data from the user terminal;
transmit the electronic data to the second information processing apparatus;
acquire identification information of the electronic data from the second information processing apparatus at certain time intervals;
transmit, to the user terminal, screen information representing a screen that associates, with the identification information, setting information of electronic contract processing to be executed on the electronic data by the second information processing apparatus;
acquire, from the second information processing apparatus in response to receiving an operation on the screen displayed by the user terminal, the setting information of the electronic data based on the identification information; and
transmit, to the second information processing apparatus, contents of the setting information input from the user terminal through the screen,
the second information processing apparatus includes second circuitry configured to:
process the electronic data received from the first information processing apparatus;
generate the identification information of the electronic data, and
the user terminal includes third circuitry configured to control a display to display the screen based on the screen information received from the first information processing apparatus.

13. A non-transitory recording medium storing a plurality of program codes which, when executed by one or more processors of an information processing apparatus, causes the one or more processors of the information processing apparatus to perform a method comprising:
receiving electronic data from a user terminal, the electronic data to be processed by the information processing apparatus;
transmitting the electronic data to another information processing apparatus via a network;
acquiring identification information of the electronic data from the another information processing apparatus at certain time intervals;
transmitting, to the user terminal, screen information representing a screen that associates, with the identification information, setting information of electronic contract processing to be executed on the electronic data by the another information processing apparatus;
acquiring, from the another information processing apparatus in response to receiving an operation on the screen displayed by the user terminal, the setting information of the electronic data based on the identification information; and
transmitting, to the another information processing apparatus, contents of the setting information input from the user terminal through the screen.

* * * * *